United States Patent
Scherzinger

(10) Patent No.: US 6,594,617 B2
(45) Date of Patent: Jul. 15, 2003

(54) PEDOMETER NAVIGATOR SYSTEM

(75) Inventor: Bruno M. Scherzinger, Richmond Hill (CA)

(73) Assignee: Applanix Corporation, Richmond Hill (CA)

(*) Notice: Subject to any disclaimer, the term of this patent is extended or adjusted under 35 U.S.C. 154(b) by 26 days.

(21) Appl. No.: 09/905,015

(22) Filed: Jul. 13, 2001

(65) Prior Publication Data
US 2002/0143491 A1 Oct. 3, 2002

Related U.S. Application Data

(60) Provisional application No. 60/226,481, filed on Aug. 18, 2000.

(51) Int. Cl.[7] ............................................. G01C 22/00
(52) U.S. Cl. ..................... 702/160; 702/150; 700/207
(58) Field of Search ......................... 364/450; 600/595; 701/1, 200, 207

(56) References Cited

U.S. PATENT DOCUMENTS

| | | | |
|---|---|---|---|
| 3,474,241 A | 10/1969 | Kuipers | |
| 3,644,825 A | 2/1972 | Davis, Jr. et al. | |
| 3,660,648 A | 5/1972 | Kuipers | |
| 3,983,474 A | 9/1976 | Kuipers | |
| 4,017,858 A | 4/1977 | Kuipers | |
| 5,307,072 A | 4/1994 | Jones, Jr. | |
| 5,453,686 A | 9/1995 | Anderson | |
| 5,583,776 A | * 12/1996 | Levi et al. | .................. 364/450 |
| 5,640,170 A | 6/1997 | Anderson | |
| 5,724,265 A | 3/1998 | Hutchings | |
| 6,132,391 A | * 10/2000 | Onari et al. | ................. 600/595 |
| 2002/0038178 A1 | * 3/2002 | Talkenberg et al. | ......... 701/200 |
| 2002/0091482 A1 | * 7/2002 | Eakle, Jr. et al. | ............ 701/207 |
| 2002/0111717 A1 | * 8/2002 | Scherzinger et al. | ........... 701/1 |

OTHER PUBLICATIONS

Scherzinger, B M; "Inertial Navigator Error Models For Large Heading Uncertainty"; IEEE Position Location and Navigation Symposium; 1996; pp. 477–487.*

HeunSoo, L; Mase, K; Adachi, T; Oosawa, T; Nakano, K; Sengoku, M; Hidaka, H; Shinagawa, N; Kobayashi, T; "Pedestrian Tracking Using GPS, Pedometer And Magnetic Compass"; Inst Electron Inf & Commun Eng; vol. 84 B No. 12; Dec. 2001; pp. 2254–2263; abs.*

Brubaker, K M; "Soldier Systems Sensor Fusion"; Proceedings of the SPIE the International Society for Optical Engineering; vol. 3394; 1998; pp. 73–78; abstract.*

Ladetto, Quentin, On foot navigation: continuous step calibration using both complementary recursive prediction and adaptive Kalman filtering, Geodetic Laboratory, Institute of Geomatics, Swiss Federal Institute of Technology, Lausanne, Switzerland, ION GPS 2000, Sep. 19–22, 2000, Salt Lake City, Utah.

* cited by examiner

Primary Examiner—Kamini Shah
Assistant Examiner—Douglas N Washburn
(74) Attorney, Agent, or Firm—James F. Kirk

(57) ABSTRACT

A pedometer navigator system has an Euler Angle Measuring Subsystem (EAMS) coupled to a body frame provides Euler angles of a fixed coordinate system with respect to a navigational coordinate system. Left and right sensors are mounted on a surveyor's feet. An SBPMS (short baseline position measuring subsystem) provides a left vector $\vec{\rho}_{left}^{\,p}$ and a right vector $\vec{\rho}_{right}^{\,p}$ characterizing the position of the sensors with respect to the SBPMS coordinate system origin. A computer means responds to the Euler angles and left and right vector and determines an interval during which the left or right foot is stationary, and providing a transition vector referenced to the earth fixed navigational coordinate system. A navigation algorithm adds each transition vector to the previous present position of the navigation reference system to obtain a next present position of the position measuring subsystem.

20 Claims, 10 Drawing Sheets

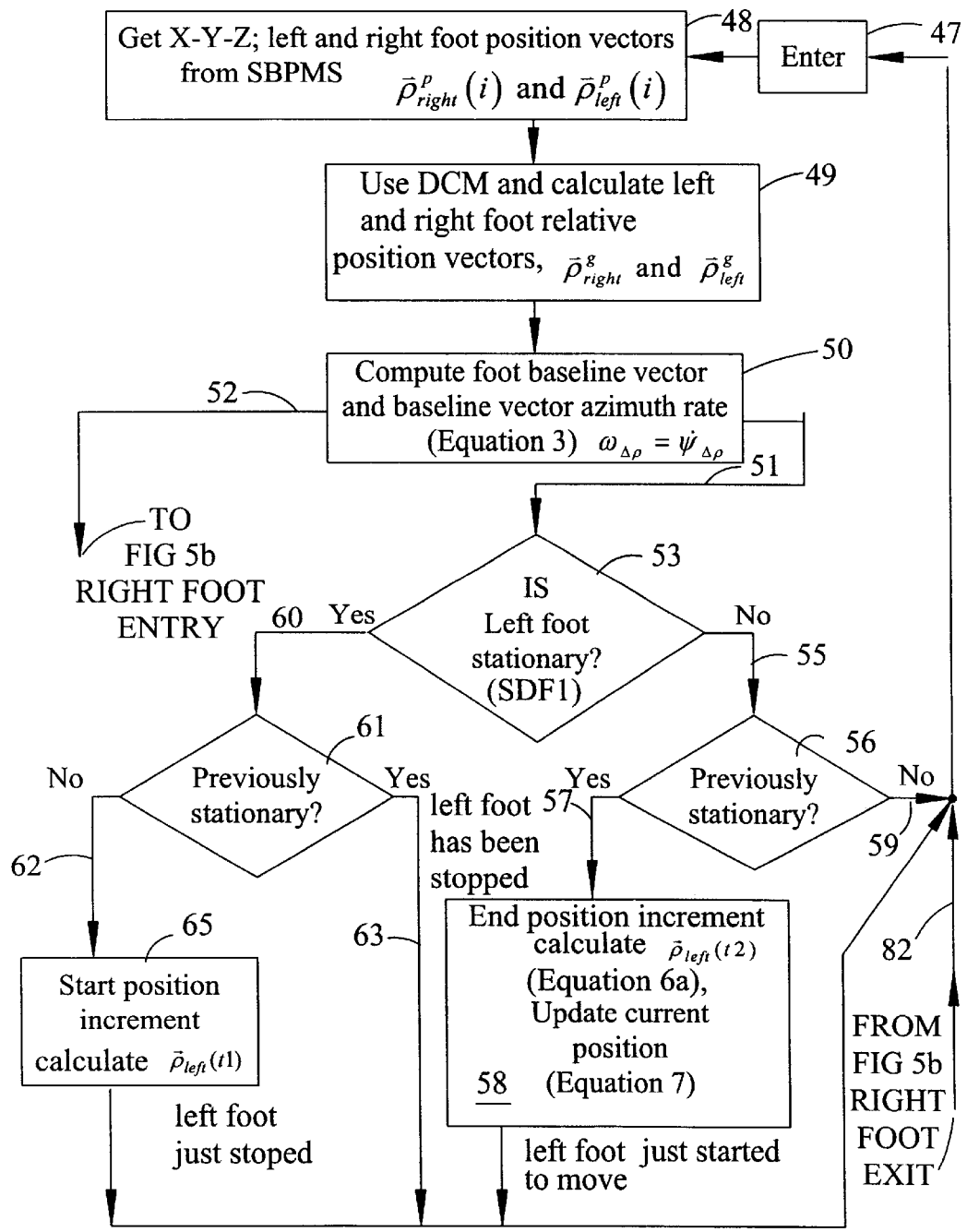
FIG. 5a  PPNSM implementation algorithm

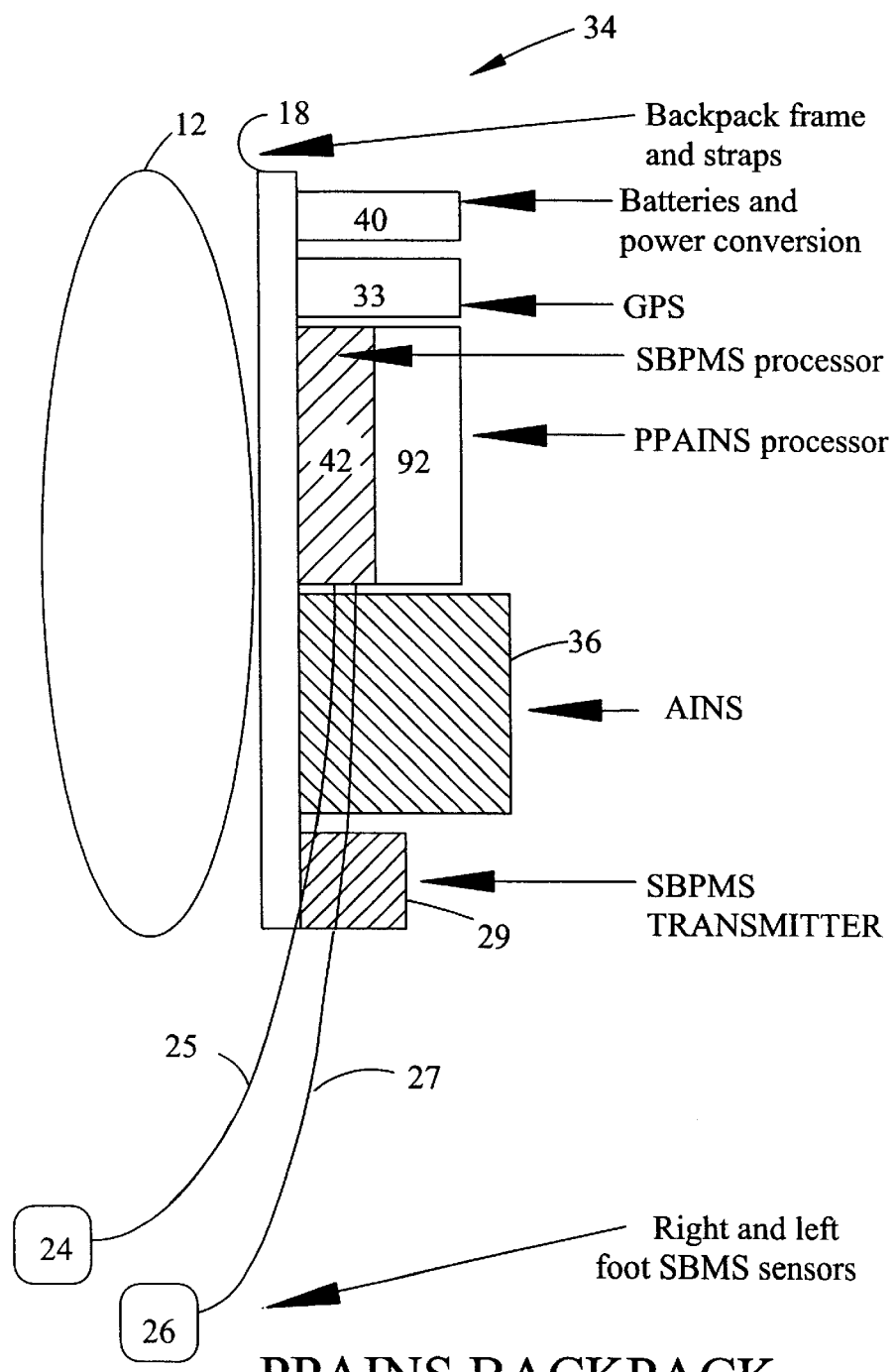
FIG. 6 PPAINS BACKPACK

US 6,594,617 B2

PEDOMETER NAVIGATOR SYSTEM

This application is a Continuation-In-Part Application and formalization of Provisional Application Ser. No. 60/226,481 filed Aug. 18, 2000 having a common inventor and assignee.

FIELD OF THE INVENTION

This invention relates to the field of pedometers and in particular to pedometers using an AINS (aided inertial navigation system).

BACKGROUND

Simple Pedometer: The simple pedometer is exemplified by a hiker's pedometer. It detects the up-down motion of the pedestrian as he takes a step, sums the number of up-down movements, and then multiplies the sum by an assumed step length. The pedestrian calibrates the pedometer by walking a measured distance and then manually entering that distance into the pedometer. The pedometer in fact maintains a simple step model for the pedestrian, and will need to be recalibrated when a different pedestrian uses the pedometer.

A complex version of a pedometer is taught in U.S. Pat. No. 5,724,265 for a "System AND METHOD FOR MEASURING MOVEMENT OF OBJECTS" issued on Mar. 3, 1998 to Lawrence J. Hutchings. This patent teaches a form of a pedometer that uses accelerometers and rotational sensors placed in the sole of a pedestrian's shoe to measure the length of the person's stride.

SUMMARY OF THE INVENTION

The invention Position and Orientation System for Land Survey (POS/LS) is carried by an operator or surveyor who walks a predetermined survey path while carrying the POS/LS as a backpack. The survey path or trajectory can and does often pass through areas where no GPS signals are available. The POS/LS must therefore navigate in a dead-reckoning mode with as little position drift as possible through those areas where GPS outages exist. The current method of position drift control requires the operator to perform frequent Zero Velocity Updates (ZUPD). The operator is required to maintain the POS/LS motionless for 15–30 seconds approximately every two minutes. Any alternative aiding information that limits the position drift during GPS outages can potentially improve the accuracy of the survey data generated by the POS/LS and allow operation with fewer or no ZUPD's.

BRIEF DESCRIPTION OF THE DRAWINGS

FIGS. 5a and 5b are high-level flow charts that explain the SBPMS program process used in the PPNSM;

FIG. 6 is a schematic of a Precise Pedometer Aided Inertial Navigation System (PPAINS) implementation on a backpack;

TECHNICAL DESCRIPTION OF THE INVENTION

Figure 1:
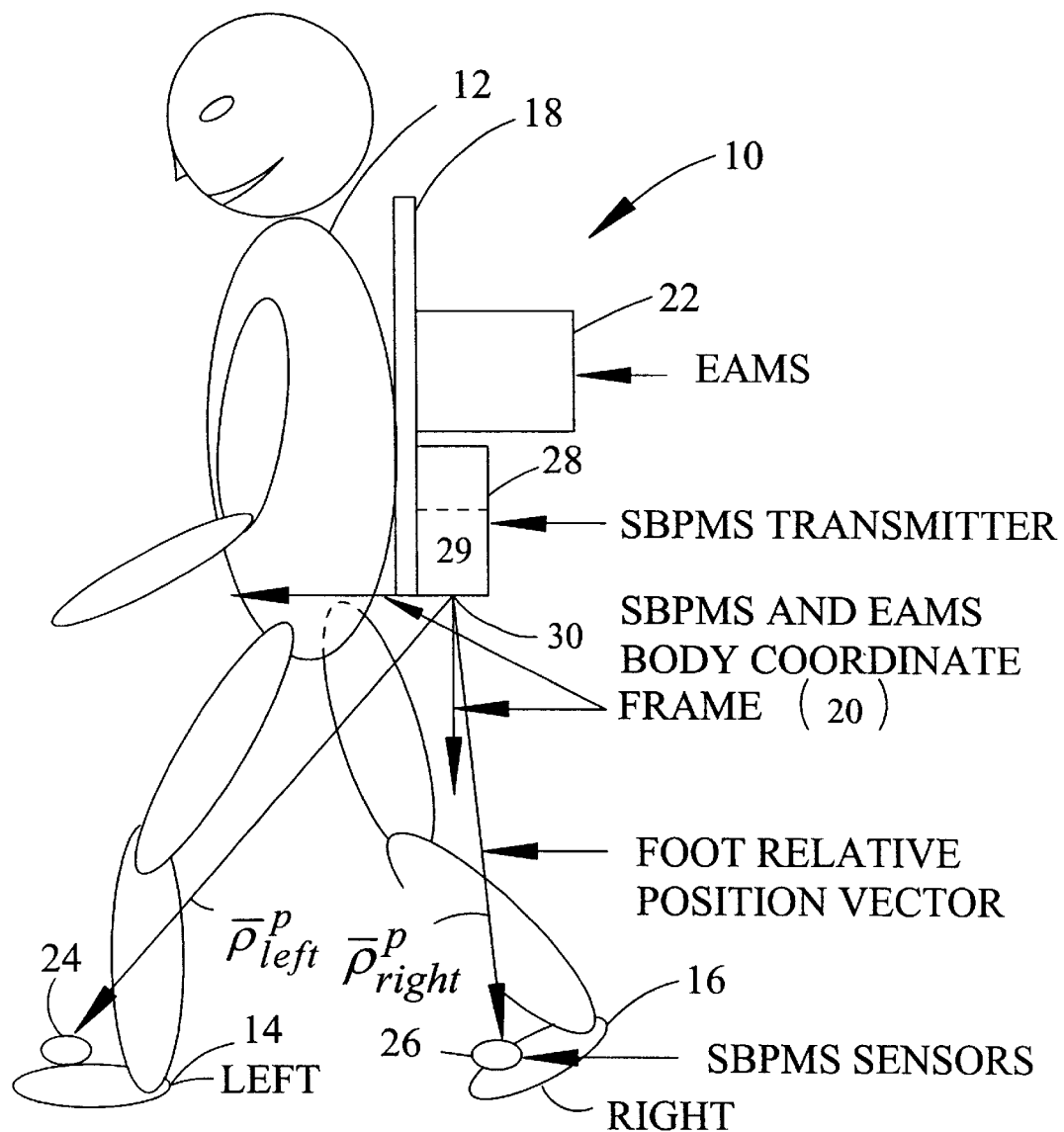
FIG. 1 is a schematic stick characterization showing the Short Baseline Position Measurement Subsystem (SBPMS) and Euler Angle Measurement Subsystem (EAMS) coordinate frame; the stick figure shifting from a stationary right foot to a stationary left foot.

FIG. 1 shows a Precise Pedometer Navigator (PPN) system 10 carried by a pedestrian or surveyor 12. The system 10 is a mechanization of a Precise Pedometer Navigator Simple Mechanization (PPNSM). The pedestrian has a left foot 14 and a right foot 16. The PPNSM 10 provides precise present position data as the pedestrian 12 walks across terrain to be surveyed.

FIG. 1 shows that the PPNSM has a body frame 18. The body frame 18 is strapped or coupled to the pedestrian 12 and provides a mounting surface for additional system components. The body frame has a right or left-handed body fixed coordinate reference frame referred to as the p-frame, 20. The p-frame originates at its origin 30 and has a right, a front and a down coordinate axis.

An Euler Angle Measuring Subsystem (EAMS) 22 has a right-handed or a left handed coordinate system and is coupled and referenced to the body frame 18 in a fixed relationship for measuring and outputting the Euler angles of the p-frame 20 with respect to a g-frame (right handed or left handed earth fixed navigational coordinate s stem which is not shown).

A Short Baseline Position Measuring System (SBPMS) 28 is coupled to the body frame 18 and uses a left sensor 24 and a right sensor 26 which are shown mounted on the pedestrian's respective left and right foot 14, 16. The SBPMS coordinate system is typically referenced to and positioned to be in a fixed relationship with the p-frame 20 for measuring and providing a respective left vector $\vec{\rho}_{left}^{\,p}$ and a right vector. The left and right vectors characterize the position of the left and right sensors 24, 26 with respect to the EAMS origin 30, and therefore, the p-frame 20 coordinate system. The motion of the sensors 24, 26 is characterized in p-frame coordinate data at a sample rate established by the SBPMS 28.

In the preferred embodiment, a computer or digital processor (not shown) is carried by or linked to the pedestrian 12. The computer receives and responds to Euler angle data from the EAMS 22. The Euler angle data characterizes the angles between the body frame 18 and the earth fixed navigational frame, such as an earth referenced, locally level frame (not shown), having mutually orthogonal and locally level north and east axes, and down axes. A wander angle alpha is measured between true north and the north axis of the navigational frame.

The processor also executes a navigational algorithm to obtain a sequence of next present position latitudes and longitudes for the position measuring subsystem 10. An explanation of the equations and algorithms used in the mechanization requires an explanation of the notation to be used.

Notation

The symbol $\vec{x}$ denotes a vector with no specific reference frame of resolution. However, the same symbol with a superscript "a" and written $\vec{x}^{\,a}$ denotes a vector resolved in a coordinate frame called the a-frame. All coordinate frames are right-handed or left-handed orthogonal frames. The X-Y-Z axes form an orthogonal triad in the forward, right and down directions.

A typical coordinate frame for use is the geographic frame or (g-frame) whose principal axes coincide with the North, East and Down directions, and the inertial sensor body frame or (b-frame), whose principal axes coincide with the input axes of the inertial sensors.

Subscripts on vectors are used to indicate a particular property or identification of the vector. For example, $\vec{l}_{S-G}{}^a$ denotes a lever arm vector resolved in an a-frame (not shown) from the inertial sensor frame origin S, such as might exist in the Aided Inertial Navigation System (AINS) package 36 in FIG. 6, the vector extending to a Global Positioning System (GPS) antenna phase center G in the GPS package 33 also in FIG. 6.

Matrices are designated with capital letters. $C_a{}^b$ Denotes a Direction Cosine Matrix (DCM) that transforms a vector from the a-frame to the b-frame, i.e., $$\vec{x}^b = C_a{}^b \vec{x}^a.$$

Time dependency of a quantity is indicated with round brackets around a time variable or index. For example, $C_a{}^b(t_1)$ denotes the value of the DCM at time $t_1$.

An increment of a variable is indicated with the symbol $\Delta$. For example, $\Delta \vec{x}$ denotes the increment of the vector $\vec{x}$ over a predefined time interval. An error in a variable is indicated with the symbol $\delta$. For example, $\delta \vec{x}$ denotes the error in the vector $\vec{x}$. $\delta \Delta \vec{x}$ denotes the error in the increment of $\vec{x}$ over a predefined time interval.

An expected need for an aided inertial navigation system for land survey applications provided motivation for the development of the subject invention. Applanix, the assignee, named the system the Position and Orientation System for Land Survey (POS/LS) 10. In use, surveyor 12 walks a survey trajectory or path over a terrain to be mapped, and carries the POS/LS as a backpack 10 to predetermined locations located by use of present position data from the POS/LS.

Survey trajectories or paths often pass through areas where no GPS signals are available. The POS/LS 10 must therefore navigate in a dead-reckoning mode with as little position drift as possible. Any aiding information that limits the position drift during GPS outages can potentially improve the accuracy of the survey data generated by the POS/LS 10 and allow operation with fewer or no ZUPD's.

INVENTION OVERVIEW

The invention comprises a Precise Pedometer Navigator (PPN) 10 whose purpose is to compute the pedestrian's position on the earth from measurements of the pedestrian's steps.

Referring again to FIG. 1, the main components of the precise pedometer navigator are: a Short-Baseline relative Position Measurement Subsystem (SBPMS) 28 that measures the position vectors of the pedestrian's feet 14, 16 with respect to a common position resolved in an SBPMS body coordinate frame, such as a p-frame, having an origin such as the origin 30.

The Euler Angle Measurement Subsystem 22 (EAMS) has the ability to measure the Euler angles of the SBPMS body frame 16 with respect to a navigation frame, such as the geographic frame or g-frame. The EAMS 22 has a right-handed or left-handed coordinate frame. The coordinates converge at an EAMS origin (not shown). The EAMS 22 provides roll, pitch and azimuth angle values for the right-handed or left-handed coordinate frame with respect to the X-Y-Z or north-east-down axes of a fixed navigation coordinate frame.

A PPN algorithm is used to compute the navigation solution. The PPN algorithm is executed by a computer or processor that is coupled to acquire and process the vector data from the SBPMS 28. The SBPMS provides the vector data referenced to the p-frame using an SBPMS transmitter 29 to excite the sensors 24, 26 on the pedestrian's feet 14, 16. The computer also uses Euler angle data from the EAMS 22 to implement the PPN algorithm.

Precise Pedometer Navigator Configuration

FIG. 1 shows a first embodiment of the PPN 10 referred to here as a Precise Pedometer Navigator Simple Mechanization (PPNSM) Implementation 32 installed on the pedestrian 12. One of the walking pedestrian's two feet is planted on the ground and is stationary (barring slippage) during each normal walking step. Each of the pedestrian's two feet are required to be instrumented with a sensor 24, 26, preferably at the toe or ball of the foot in the PPNSM Implementation.

The Short Baseline Position Measuring Subsystem 28 (SBPMS) has an SBPMS coordinate frame having an SBPMS origin 30 for measuring and providing a continuous series of time indexed left position vectors shown on FIG. 1 as $\vec{\rho}_{left}{}^p$ and right position vectors $\vec{\rho}_{right}{}^p$. The left and right position vectors are provided by the SBPMS 28 in coordinate values characterizing the position of the left and right foot with respect to the SBPMS origin 30.

The SBPMS transmitter 29 is rigidly mounted with respect to the EAMS 22 so that the respective body coordinate frames of the EAMS 22 and SBPMS transmitter 29 are fixed with respect to each other. The relative Euler angles between the reference frames of the EAMS and the SBPMS are constant and measurable. Frame 16 provides the necessary mechanical link; however, as an alternative, the EAMS could be rigidly coupled directly to the SBPMS 28 thereby integrating the function of the frame 16 into the EAMS and or the SBPMS packaging. Misalignment of the p-frame and the EAMS coordinate system could be adjusted out by transforming all p-frame vectors into vectors referenced to the EAMS coordinate system by mechanical adjustment or by a software vector transformation using an appropriate DCM.

The SBPMS provides continuous high rate (50 Hz) measurements of the X-Y-Z coordinates of each of the pedestrian's two feet in a known coordinate frame, such as the p-frame, fixed to the SBPMS 28. The EAMS 22 provides the Euler angles of the EAMS coordinate frame and hence the SBPMS coordinate frame with respect to an earth fixed navigation frame, such as the g-frame. The navigation frame can be any coordinate frame that has the following characteristics:

It is locally stable, implying that it is unchanged during the navigation time interval.

Position vectors resolved in the navigation frame can be used to compute position coordinates that include among others, geographic coordinates having latitude, longitude and altitude components and Universal Transverse Mercatur (UTM) coordinates having easting, northing and height components.

Examples of navigation frames that the PPN 10 can use include among others the following:

1. The geographic frame or g-frame, also called the NED frame, which has axes in the North, East and Down directions.
2. A wander angle frame that has locally level X and Y axes (i.e., the plane formed by the X and Y axes that is orthogonal to the local gravity vector) and a known X-axis azimuth with respect to true North called the wander angle. The wander angle frame is typically the preferred navigation frame in an INS.
3. An earth-centered-earth-fixed (ECEF) coordinate frame has X-Y-Z axes that are fixed to the rotating earth. The WGS84 ECEF frame used by GPS receivers has X and Y axes lying in the equatorial plane with the X-axis pointed through the intersection of the equator and the Greenwich meridian. The Z-axis lies on the earth's axis of rotation and points through the North Pole. The Y-axis completes the right-handed or left-handed orthogonal triad.

In an alternative embodiment, for example, the PPN 10 is programmed to transform the SBPMS left and right relative displacement vectors from the geographic frame to the WGS84 ECEF coordinate frame and sum the transformed position vector increments to obtain a position displacement resolved in the ECEF frame. The transformation from a geographic frame to the WGS84 ECEF frame is specified in references such as [1] "George Siouris, *Aerospace Avionics Systems, A Modern Synthesis,* Academic Press 1993", and requires the approximate current latitude and longitude coordinates which are known to the PPN.

The navigation frame to be used by the preferred embodiment will be the geographic or NED frame for simplicity but without loss of generality. The Euler angles measured by an EAMS with respect to the geographic frame are called roll, pitch and true heading. It should be understood that there is no loss of generality in this assumption because the PPN 10 could be mechanized with suitable programming to perform its data processing in any other navigation frame, if required or desired, by transforming the SBPMS left and right relative displacement vectors from the geographic frame to the new navigation frame.

Referring again to FIG. 1, the PPN 10 detects that the pedestrian's left/right foot is stationary and the other foot is moving using methods that are dependent on the PPN mechanization. The PPN computes the change in position of the SBPMS transmitter 29 in geographic coordinates as the difference of the foot position vectors at the beginning and end of the step while the left/right foot is stationary.

Figure 2:
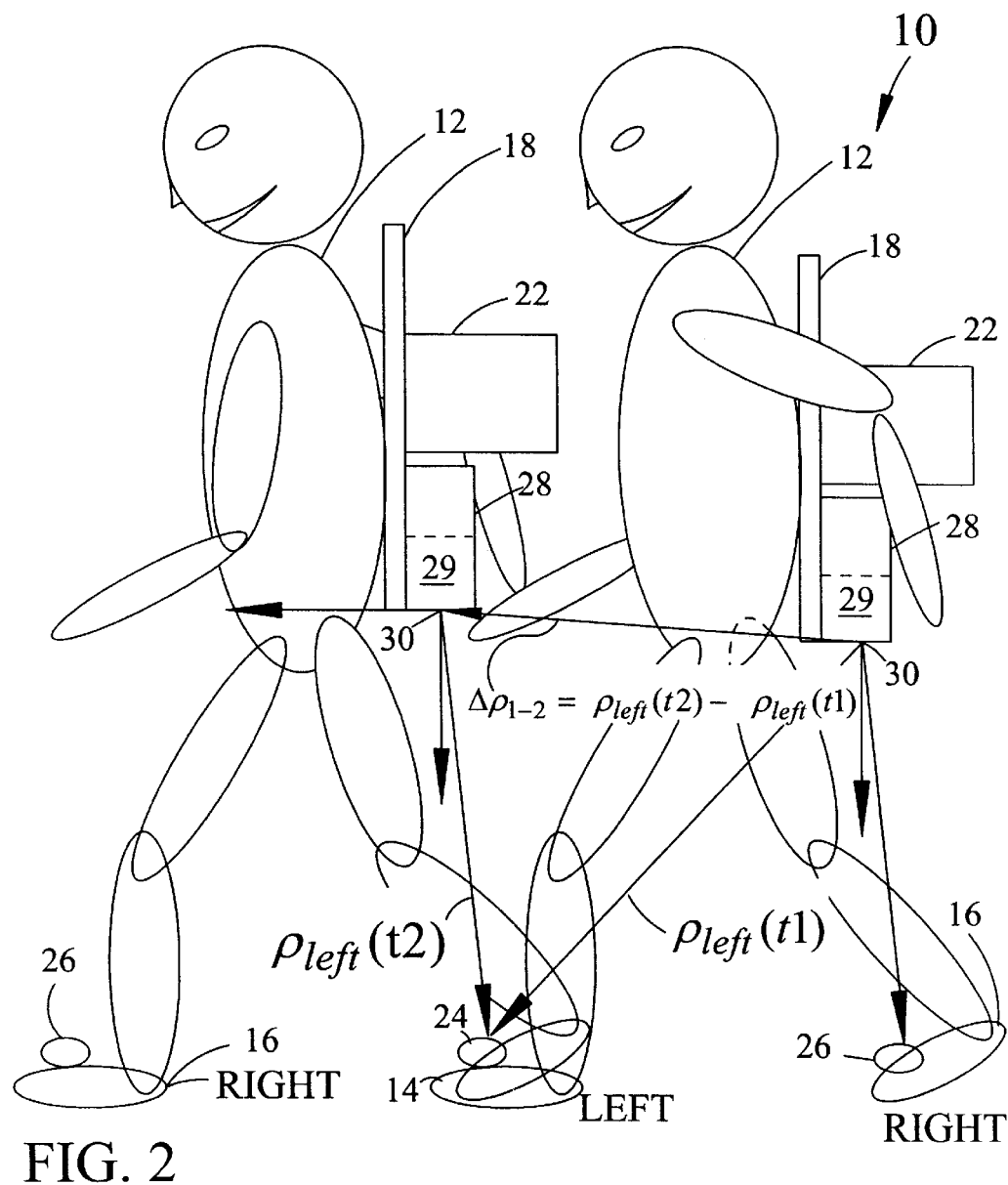
FIG. 2 is a schematic stick characterization showing the SBPMS and EAMS coordinate frame and vectors extending from the origin of the SBPMS coordinate system to a left and right foot sensor; the stick figure having a stationary left foot during half a stride.

FIG. 2 shows the geometry of a right footstep while the left foot is stationary. The PPN repeats the computation for the left foot 14 while the right foot 16 is stationary. The data generated from this stage of processing is a series of SBPMS left and right relative displacement vectors resolved from the SBPMS and EAMS body coordinate frame 20, such as the p-frame, into the common geographic frame such as the g-frame (or any other common navigation frame). The difference vector $\Delta \vec{\rho}_{foot}^{\,p}$ in FIG. 2 is depicted as a p-frame vector developed from the difference of two other p-frame vectors. In the preferred embodiment, the right and left foot time indexed relative position vectors are transformed using a direction cosine matrix transformation into $\vec{\rho}_{left}^{\,g}$ and $\vec{\rho}_{right}^{\,g}$ vectors in the common geographic or g-frame to permit the computation of the time indexed relative position vectors $\Delta \vec{\rho}_{foot}^{\,g}$ for use in the computation of an updated present position.

PPNSM Implementation

Figure 3:
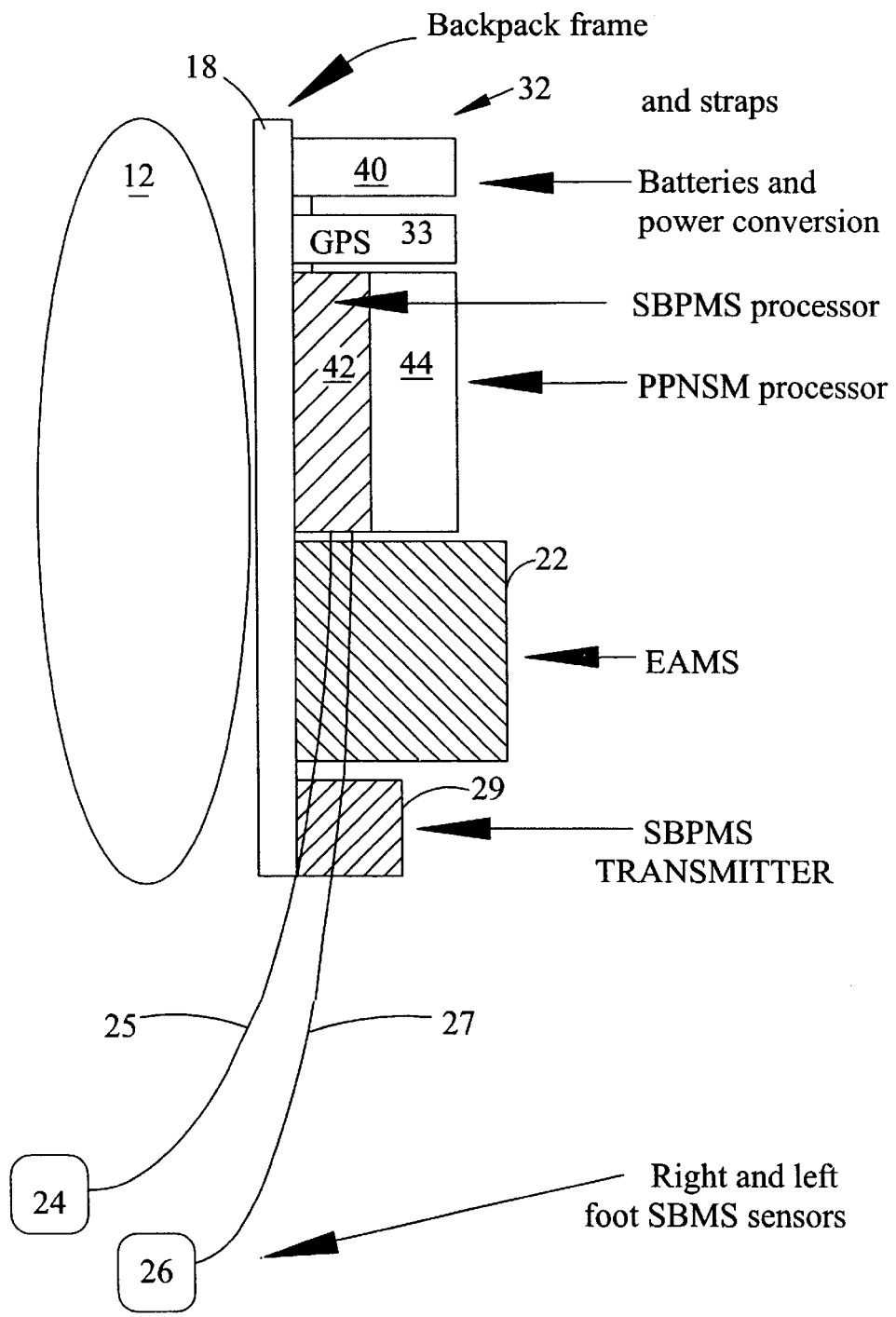
FIG. 3 is a schematic of a Precise Pedometer Navigator Simple Mechanization (PPNSM) implementation on a backpack.

FIG. 3 shows a first embodiment of the PPN system, a backpack combination, called the Precise Pedometer Simple Mechanization (PPNSM) 32. The PPNSM 32 uses any EAMS 22 or Attitude and Heading Reference System (AHRS) for Euler angle measurement and an SBPMS 28 for the generation of foot time indexed relative position vector $\vec{\rho}_{left}^{\,p}$ and $\vec{\rho}_{right}^{\,p}$ shown in FIGS. 1 and 2. The SBPMS is an accurate vector measuring system such as those available from Polhemus Inc. of 40 Hercules Drive, P.O. Box 560, Colchester, Vt. 05446, USA, for foot position vector generation.

The PPNSM transforms the time-indexed relative position vectors into SBPMS left foot and right foot relative position vectors in the common geographic frame, the g-frame. The PPNSM then uses the SBPMS left foot and right foot relative position vectors to calculate a sequence of SBPMS left relative displacement vectors and right relative displacement vectors in the g-frame each of which characterizes the motion of the origin of the SBPMS in response to the motion of each respective foot while the alternate foot is stationary. The PPNSM continuously sums available SBPMS left and right relative displacement vectors to form a series of SBPMS position displacement vectors in the g-frame which it sums to calculate an aggregate SBPMS position displacement vector from a starting position to the current position. The starting position can be a surveyed position monument or a position as reported by a GPS receiver 33. The summation of the SBPMS left and right relative displacement vectors to obtain present position can include filtering, error checking, reasonableness testing on the incremental position displacements, interpolation of missing data, and/or other methods for improving the quality of the SBPMS left and right relative displacement vector data. The PPNSM then computes the pedestrian's current position as the starting position plus the aggregate SBPMS position displacement vector. The PPNSM cannot tolerate a loss of SBPMS left or right relative displacement vector data due to a data outage in either the EAMS or SBPMS and maintain its position accuracy.

PPAINS Implementation

FIG. 6 schematically shows a second embodiment of the PPN 10, the Precise Pedometer Aided INS (PPAINS) 34 as a backpack combination. The PPAINS combination 34 is the preferred embodiment or best mode for practicing the invention in terms of achievable accuracy and flexibility of use.

Figure 7:
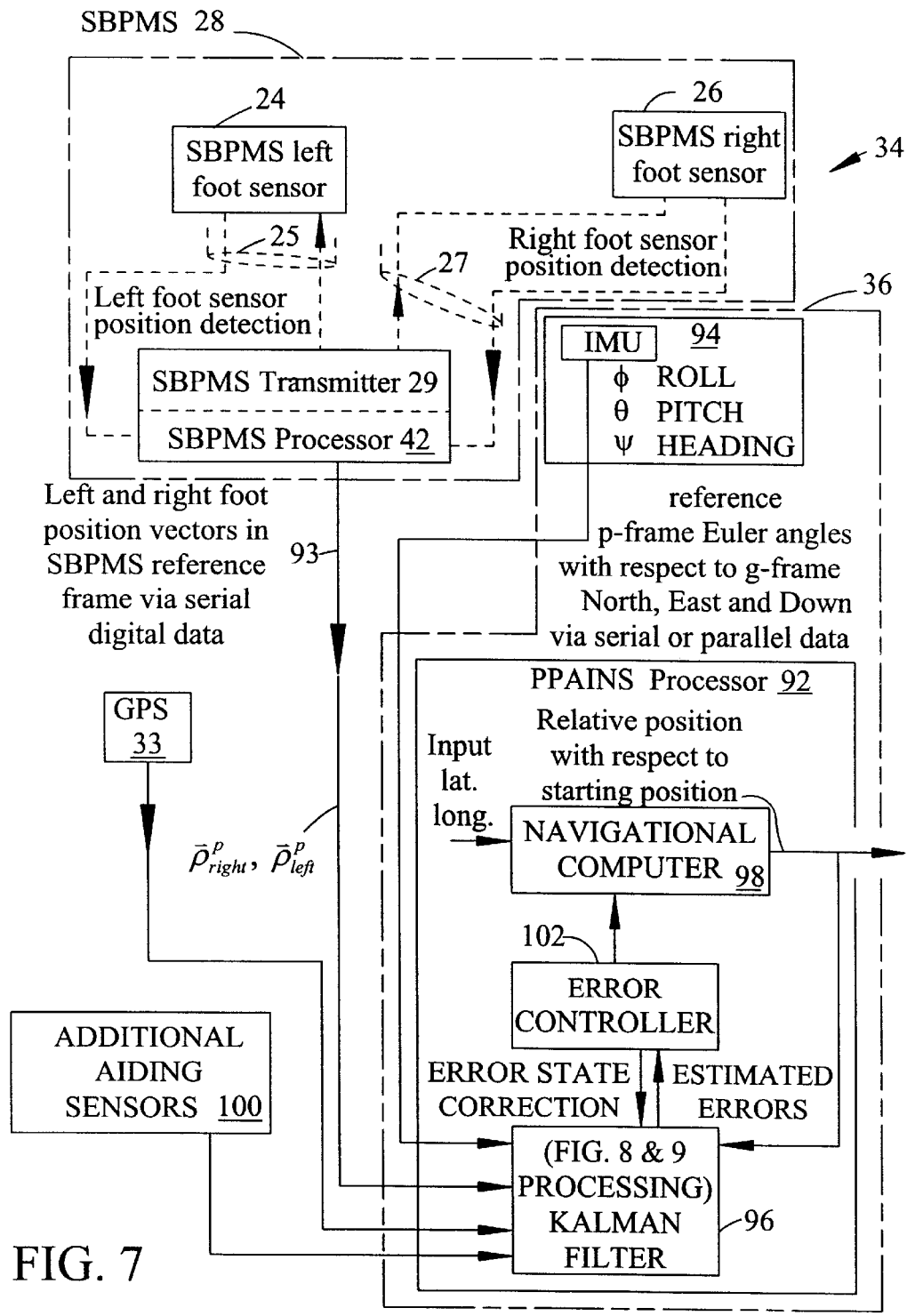
FIG. 7 is a functional block diagram of a PPAINS.

FIG. 7 is a schematic block diagram of the PAINS combination 34. An Aided Inertial Navigation System (AINS) 36 is available from Applanix, the assignee as well as from a number of other supplier of inertial guidance systems such as the Guidance Systems Division of Northrop Systems, Inc. of Woodland Hills, Calif., and an accurate SBPMS 28 system is available from Polhemus Inc. of 40 Hercules Drive. P.O. Box 560. Colchester, Vt. 05446, USA.

Unlike the SBPMS, the PPAINS 34 does not use the vector information from the SBPMS to calculate an aggregate SBPMS position displacement vector. The PPAINS system uses the computed SBPMS left and right relative displacement vectors from each step as aiding data for the Kalman filter 96 of the AINS shown in FIG. 7. The Kalman filter compares the SBPMS left and right relative displacement vectors with an equivalent right or left inertial navigation solution displacement vector, and thereby estimates inertial navigator velocity errors and alignment (roll, pitch, heading) errors. The SBPMS left and right foot relative displacement vectors are handled independently of the previous or next step. If both feet are stationary for a brief instant between each step, the computed changes in SBPMS position data from one step to the next overlap. The aiding data developed from the SBPMS processor data is similar in character to that provided by an odometer.

FIG. 7 shows error controller 102 that corrects the inertial navigator position, velocity and alignment errors based on the Kalman filter estimates of position, velocity and alignment errors. Closed-loop INS error regulation with arbitrary aiding data is well to those skilled known in the art and is described in texts such as reference [1] "George Siouris, *Aerospace Avionics Systems, A Modern Synthesis*, Academic Press 1993". Closed-loop error regulation is achieved by the combination of FIG. 7 as the SBPMS precise pedometer aiding data is used to regulate the inertial navigator errors during periods when GPS data is interrupted or otherwise becomes unavailable. The aiding data improves the dead-reckoning position accuracy of the AINS 36 during GPS outages.

TECHNICAL DETAILS

The following is a description of algorithms for the PPNSM 32 and PPAINS 34 embodiments of the PPN 10. The algorithms are used to process measurement data from the SBPMS and to compute the trajectory over land of coordinate origin 30 of the SBPMS reference schematically shown in FIGS. 1 and 2. The SBPMS system generates left and right foot baseline vector data for each step that the PPN processor converts using Euler angles and a related direction cosine matrix into SBPMS left and right relative displacement vector data.

A first left relative position vector is synchronized and identified with a first point in time as ($t_1$) at which a sensor stops and a second left relative position vector is synchronized and identified with a second point at ($t_2$) at which time the same sensor begins to move. The vector difference between the two left relative position vector values is referenced to the g-frame to obtain an SBPMS left relative displacement vector as calculated by Equation 6a. The SBPMS left relative displacement vector therefore represents a first transition vector in fixed navigation coordinate frame values, characterizing the movement of the SBPMS origin 30 for each interval that a left foot is stationary and the right foot is moving.

The process is duplicated and the difference is taken between two right foot relative position vectors to obtain an SBPMS right relative displacement vector as calculated by Equation 6b. The SBPMS right relative displacement vector therefore represents a second transition vector in fixed navigation coordinate frame values, i.e., g-frame values, characterizing the movement of the SBPMS origin 30 for each interval that a right foot is stationary and the left foot is moving.

The SBPMS left and right relative displacement vectors characterize the trajectory of the SBPMS origin 30 shown in FIGS. 1 and 2. Algorithms for use by both the PPNSM and PPAINS 34 include the following components:

1. A stationary foot detection algorithm to determine if the right or left foot is stationary during a step or if both feet are stationary. Two example algorithms named SFD1 and SFD2 are given below. The SFD1 algorithm can be used in any alternative embodiment, whereas the SFD2 algorithm is designed specifically for use in the PPAINS 34. If the left foot has begun to be stationary, then the right foot is stationary or moving. Hence the position increment will be due to the right foot moving from its previous stationary position to its next stationary position, and the SBPMS transmitter will under go a displacement due to this motion. The left leg attached to the stationary left foot is like a stick with one end planted to the ground and the other end at the origin or transmitter 29, rotating about the stationary end. The displacement of the rotating end is the displacement we want. Euler angle data from the EAMS or from an IMU is used by algorithms in the PPN processor form a Direction Cosine Matrix (DCM) to transform the right and left foot position vector data into locally level right and left foot time indexed relative position vectors. The difference is taken to form a foot baseline vector which provides North East and Down components.

2. The position increment computation algorithm of Equations 6a and 6b (discussed later) computes the SBPMS 28 left and right relative displacement vectors during each single step and is used in both the PPNSM 32 and the PPAINS 34 embodiments. Successive pairs of left and right relative displacement vectors are added to obtain SBPMS position displacement vectors.

3. The SBPMS position displacement computation algorithm of Equation 7 (discussed later) computes the SBPMS current position by adding an aggregate position displacement vector, formed by summing the SBPMS position displacement vectors, to a known SBPMS starting position. The PPAINS 34 uses a different algorithm to compute the SBPMS position, which would be an algorithm specific to the supplier and the software of the AINS that is used.

4. The DCM transforms foot position vectors of Equation 1a and 1b into time indexed relative position vectors. The synchronized differences of the time indexed relative position vectors are used to form SBPMS left and right relative displacement vectors at the beginning and at the end of each foot stationary time in g-frame coordinates.

First Stationary Foot Detection (SFD1) Algorithm

The SFD1 algorithm is designed to operate on the following data that all alternative embodiments produce, and hence can be used by all alternative embodiments:

The SBPMS provides continuous measurements of the X-Y-Z coordinates of the sensor position on each foot resolved in the SBPMS coordinate frame, hereafter called the p-frame. The SBPMS data is cast into an indexed foot position vector $\vec{\rho}_i^{\,p}$, where the superscript p identifies the coordinate frame and the subscript i identifies the foot, either left or right.

The EAMS generates the roll, pitch and heading angles that describe the orientation of the SBPMS coordinate frame with respect to the geographic frame. The algorithm computes the left and right foot time indexed relative positions and their difference at any instant in time:

$$\vec{\rho}_{left}^{\,g} = C_p^g \vec{\rho}_{left}^{\,p} \tag{1a}$$

$$\vec{\rho}_{right}^{\,g} = C_p^g \vec{\rho}_{right}^{\,p} \tag{1b}$$

$$\Delta \vec{\rho}_{foot}^{\,g} = \vec{\rho}_{right}^{\,g} - \vec{\rho}_{left}^{\,g} \tag{1c}$$

where $\vec{\rho}_{left}^{\,p}$ and $\vec{\rho}_{right}^{\,p}$ are the foot time indexed relative position vectors measured by the SBPMS at that instant in time. $\Delta \vec{\rho}_{foot}{}^g$ is a foot baseline vector. $C_p{}^g$ is a direction cosine matrix (DCM) computed from the EAMS roll, pitch and heading solution that transform the vectors in p-frame coordinates into vectors in the geographic frame, or g-frame coordinates, as follows:

$$C_p^g = \begin{bmatrix} \cos\theta\cos\psi & -\cos\phi\sin\psi + \sin\varphi\sin\theta\cos\psi & \sin\phi\sin\psi + \cos\varphi\sin\theta\cos\psi \\ \cos\theta\sin\psi & \cos\phi\cos\psi + \sin\varphi\sin\theta\sin\psi & -\sin\phi\cos\psi + \cos\varphi\sin\theta\sin\psi \\ -\sin\theta & \sin\phi\cos\theta & \cos\phi\cos\theta \end{bmatrix} \quad (1d)$$

The variables $\phi$, $\theta$ and $\psi$ are defined by the EAMS 22 to be the roll, pitch and the heading of the p-frame with respect to the g-frame, i.e., North, East and Down directions. The use of such transformations is known to those skilled in the art.

However, as background, those interested can refer to reference [1] mentioned above by George Siouris for a general description of a DCM and coordinate transformations between coordinate frames.

The method or algorithm for processing the values of $\vec{\rho}_{left}{}^P$ and $\vec{\rho}_{right}{}^P$ at the cyclic rate of the SBPMS to obtain a time indexed baseline vector north component $\Delta\rho_N$ and an indexed baseline vector east component $\Delta\rho_E$ for the computation of corresponding values of comprising the steps of continuously:

1. calculating a time indexed direction cosine matrix (DCM),
2. multiplying a time indexed left position vector $\vec{\rho}_{left}{}^P$ and right position vector $\vec{\rho}_{right}{}^P$ by the respective time indexed DCM to obtain a respective time indexed left time indexed relative position vector $\vec{\rho}_{left}{}^g$ and right time indexed relative position vector $\vec{\rho}_{right}{}^g$ in fixed navigation coordinate frame values,
3. calculating a time indexed baseline vector by subtracting the left time indexed relative position vector from the right time indexed relative position vector, each time indexed baseline vector having a time indexed baseline vector north component $\Delta\rho_N$ and an indexed baseline vector east component $\Delta\rho_E$ and calculating, $$\psi_{\Delta\rho} = \arctan\left(\frac{\Delta\rho_E}{\Delta\rho_N}\right) \quad (2)$$

where $\psi_{\Delta\rho}$ the azimuth of the foot baseline vector $\Delta\vec{\rho}_{foot}{}^g$ with North and East components $\Delta\rho_N$ and $\Delta\rho_N$, and the angular or rotational rate of the foot baseline vector is given by:

$$\omega_{\Delta\rho} = \dot{\psi}_{\Delta\rho} = \frac{1}{\Delta\rho_N^2 + \Delta\rho_E^2}(\Delta\rho_N \Delta\dot{\rho}_E - \Delta\rho_E \Delta\dot{\rho}_N) \quad (3)$$

The SFD1 algorithm determines which foot is stationary and which is moving by application of the following three rules:

1. If $\omega_{\Delta\rho}=0$ then both of the pedestrian's feet are stationary.
2. If the pedestrian's left foot is moving forward with respect to his right foot, then $\omega_{\Delta\rho}>0$. If the pedestrian is walking forward, then his right foot is stationary.
3. If the pedestrian's right foot is moving forward with respect to his left foot, then $\omega_{\Delta\rho}<0$. If the pedestrian is walking forward, then his left foot is stationary.

The SFD1 algorithm assumes that the pedestrian is always walking forward in a normal fashion. The algorithm provides an incorrect result in the following four pathological cases:

1. The pedestrian walks backwards.
2. The pedestrian swings one foot back and forth without walking.
3. The pedestrian slides on a slippery surface as on skates or skis.
4. The pedestrian is transported without walking, for example in a car or a boat.

Second Stationary Foot Detection (SFD2) Algorithm

The SFD2 algorithm is the preferred mode method for stationary foot detection. The SFD2 algorithm requires use of an AINS 36 and an SBPMS 28. The SFD2 algorithm uses the same SBPMS and the same $\phi$, $\theta$ and $\psi$ data that the SFD1 algorithm requires. The SFD2 algorithm also requires that the AINS provide a sequence of indexed measurements of present position from which the SBPMS origin position can be computed.

Figure 8:
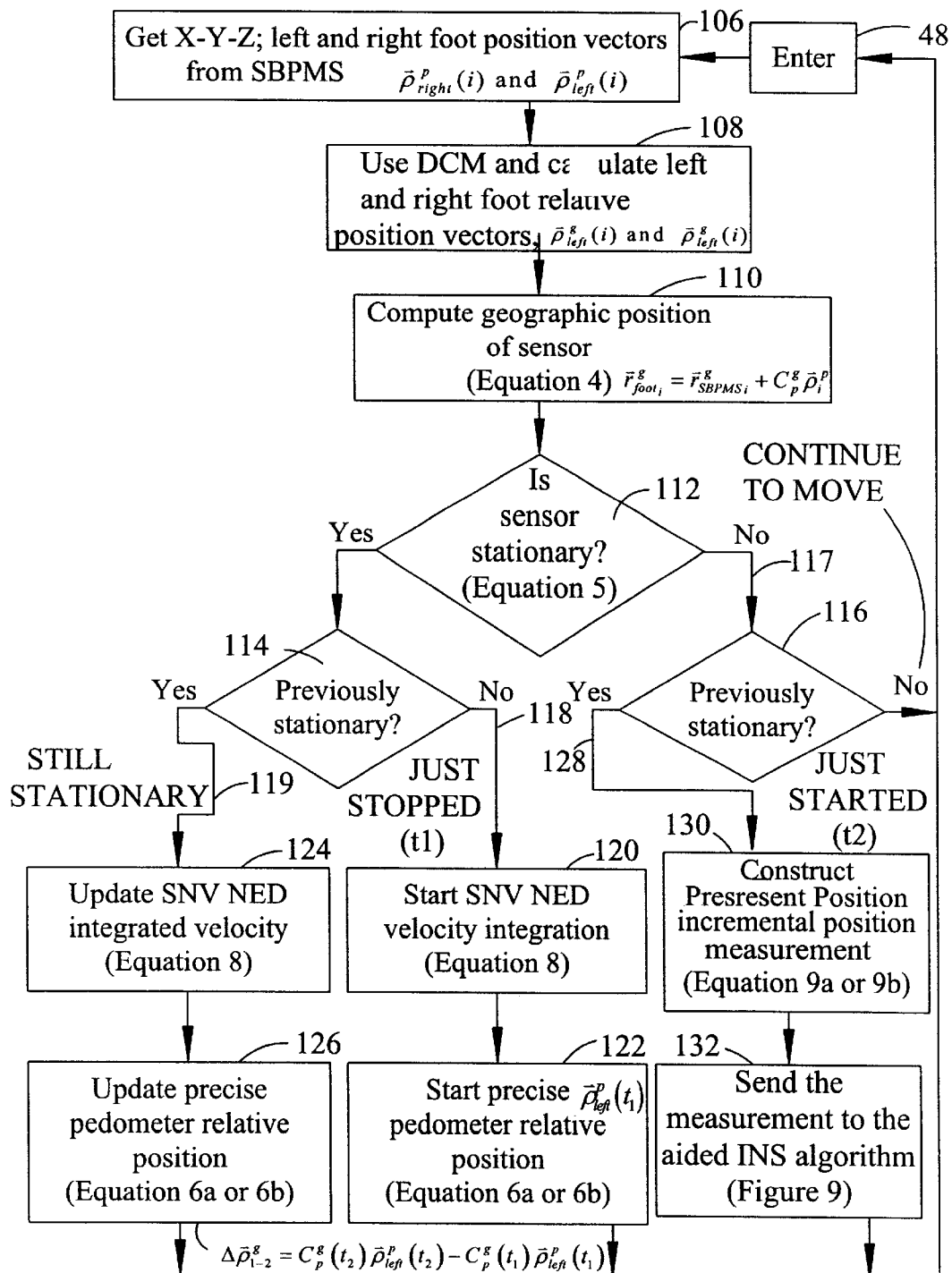
FIG. 8 is a high level flow diagram for the PPAINS measurement algorithm.

The SFD2 algorithm, as shown in FIG. 8 for a single sensor, operates on the SBPMS data for each foot separately and individually. Each SFD2 algorithm operates independently with no requirement for SBPMS data for the other foot. With two sensors being used, the flow chart of FIG. 8 would be duplicated to service the second sensor. As with the SFD1 algorithm, SBPMS data is provided for vectors $\vec{\rho}_i{}^P$, as a series of foot time indexed relative position vectors for the left or right or for each of both feet, where the superscript p identifies the coordinate frame and the subscript i identifies the index or sample number.

The absolute (right or left) foot position in geographic coordinates is then provided by:

$$\vec{r}_{foot_i}{}^g = \vec{r}_{SBPMS}{}^g + C_p^g \vec{\rho}_i{}^P \quad (4)$$

where $\vec{r}_{SBPMS}{}^g$ is the geographic position of the SBPMS as obtained from the AINS navigation solution for the present position of the SBPMS origin at a sample time t, and $C_p{}^g$ is a direction cosine matrix (DCM) given by (1c) computed from the AINS roll, pitch and heading solution that transforms from the p-frame to the g-frame.

The SFD2 algorithm determines that the foot is stationary when successive measurements of geographic foot position are unchanged within a tolerance for expected AINS velocity error. This velocity error is expected to be on the order of 0.05 meters/second or less, and is significantly smaller than the velocity of a moving foot. Hence if the following condition holds over a short test time interval $\Delta t$ of typically 1 second or less, $$|\vec{r}_{foot_i}{}^g(t+\Delta t) - \vec{r}_{foot_i}{}^g(t)| < \Delta r_{moving} \quad (5)$$

where $\vec{r}_{foot_i}{}^g(t)$ and $\vec{r}_{foot_i}{}^g(t+\Delta t)$ represent the right or left foot position vector for a first index time t and for a second index time t+Δt and $\Delta r_{moving}$ is a position displacement threshold for a moving foot, then the foot is declared to be stationary. If the AINS velocity error is 0.05 meters/second or less, then $\Delta r_{moving}$ is computed as 0.5×Δt.

The SFD2 algorithm treats each foot separately, and hence is able to handle all of the pathological cases that cause the SFD1 algorithm to fails to handle.

Position Increment Computation

All alternative embodiments use the algorithm of Equation 6a and 6b to compute the SBPMS left and right relative displacement vectors in the geographic or g-frame.

When PPN algorithm of Equation 5 determines the right or left foot to be stationary using the SFD1 or SFD2 algorithm or both, it computes the translation of the SBPMS origin 30 during the time the foot is stationary. The following equations illustrate the concept for computing translation of the SBMS origin using an SBPMS left relative displacement vector, $$\Delta \vec{\rho}_{1-2}{}^g = C_p{}^g(t_2)\vec{\rho}_{left}{}^p(t_2) - C_p{}^g(t_1)\vec{\rho}_{left}{}^p(t_1) \qquad (6a)$$

a SBPMS right relative displacement vector, $$\Delta \vec{\rho}_{2-3}{}^g = C_p{}^g(t_3)\vec{\rho}_{right}{}^p(t_3) - C_p{}^g(t_2)\vec{\rho}_{right}{}^p(t_2) \qquad (6b794)$$

and an SBPMS position displacement vector, $$\Delta \vec{\rho}_{1-3}{}^g = \Delta \vec{\rho}_{1-2}{}^g + \Delta \vec{\rho}_{2-3}{}^g \qquad (6c)$$

where $C_p{}^g(t_i)$ is the p-to-g DCM given by (1c) at the sample time $t_i$ with $t_1 < t_i < t_2$.

The left foot is stationary in the time interval $[t_1, t_2]$ and the right foot is moving forward. The vector result of Equation (6a) describes the computed North-East-Down displacement of the SBPMS over this interval. The right foot is stationary in the time interval $[t_2, t_3]$ and the left foot is moving forward. The vector result of Equation (6b) describes the computed North-East-Down displacement of the SBPMS over this interval. Note that the time intervals can overlap if both feet are stationary, i.e., the pedestrian plants the right foot before lifting the left foot. Then vector results of Equation (6c) describes the computed North-East-Down displacement of the SBPMS over a complete stride in the time interval $[t_1, t_3]$.

PPNSM Position Computation

A simple embodiment (i.e., any embodiment other than the preferred mode) computes the pedestrian's position as follows. FIG. 1 shows that the times at which either foot is stationary overlap if the pedestrian is walking. Running introduces errors as both feet break contact with the ground and is not contemplated as a proper mode for operation. In the case of FIGS. 1 and 2, the SBPMS position increments can be summed to generate the total SBPMS position displacement vector from a geographic starting position $\vec{r}_{start}{}^g$ and from that present position, the pedestrian's SBPMS current position is determined from:

$$\vec{r}^g(t_{current}) = \vec{r}_{start}^g + \sum_{t_{start}}^{t_{current}} \Delta \vec{\rho}_{1-3}^g(t_i) \qquad (7)$$

by the steps of:

adding all SBPMS position displacement vectors $\Delta \vec{\rho}_{1-3}{}^g$ from a starting time to the current time to form an aggregate SBPMS position displacement vector, and then summing the result of the previous step with the a SBPMS starting position $\vec{r}^g_{start}$.

PPAINS Position Computation

The following process will provide a PPAINS 34 position computation using the SBPMS left and right relative displacement vectors provided by Equations 6a and 6b and the SBPMS position displacement vector 6c. Variations may be expected with each separate supplier of an AINS.

Typically, the AINS Kalman filter receives the SBPMS left and right relative displacement vectors $\Delta \vec{\rho}_{1-2}{}^g$ as computed in (6) along with the inertial navigation solution displacement $\Delta \vec{r}_{SNV1-2}{}^g$ computed as follows:

$$\Delta \vec{r}_{SNV1-2}^g = \int_{t_1}^{t_2} \left( \vec{v}_{SNV}^g + C_b^g (\vec{\omega}_S^b \times \vec{l}_{S-P}^b) \right) dt \qquad (8)$$

where:

$\vec{v}_{SNV}{}^g$ is the inertial navigator velocity NED components, $\vec{\omega}_S{}^b$ is the AINS angular rate, and $\vec{l}_{S-P}{}^b$ is the lever arm vector from the AINS inertial center, i.e., the inertial center of its inertial measuring unit (IMU) to the SBPMS measurement origin.

The Kalman filter measurement differences the SBPMS left and right relative displacement vectors or, only one of them if only one is available, for each foot with the corresponding displacement computed from the inertial navigation solution for the same time interval, the difference being:

$$\vec{z}_{SNV-PP} = \Delta \vec{r}_{SNV1-2}{}^g - \Delta \vec{\rho}_{1-2}{}^g \qquad (9a)$$

$$\vec{z}_{SNV-PP} = \Delta \vec{r}_{SNV2-3}{}^g - \Delta \vec{\rho}_{2-3}{}^g \qquad (9b)$$

The measurement of $\vec{z}_{SNV-PP}$ makes the position, velocity and attitude errors in the inertial navigator and precise pedometer observable to the Kalman filter, as is shown below in equation (10), and allows an appropriately designed Kalman filter to estimate and hence regulate these errors. The error regulation mechanism will control the inertial navigator velocity error to be nearly zero and thereby obtain a low position error drift.

$$\vec{z}_{SNV-PP} = (\Delta \vec{r}_{true}{}^g + \delta \Delta \vec{r}_{SNV}{}^g) - (\Delta \vec{\rho}_{true}{}^g + \delta \Delta \vec{\rho}_{i-j}{}^g) = \delta \Delta \vec{\rho}_{SNV}{}^g - \delta \Delta \vec{\rho}_{i-j}{}^g \qquad (10)$$

where:

$\Delta \vec{r}_{true}{}^g$ is the true displacement computed by the inertial navigator, $\delta \Delta \vec{r}_{SNV}{}^g$ is the error in the inertial navigator displacement, $\Delta \vec{\rho}_{true}{}^g$ is the true displacement computed by the precise pedometer, $\delta \Delta \vec{\rho}_{i-j}{}^g$ is the error in the precise pedometer displacements (i–j=1–2 or 3–4) The Kalman filter processes the two vector measurements of equations (9a) and (9b) separately, one for the left foot and one for the right foot. If the stationary footfalls overlap so that equation (7) holds, then the precise pedometer aiding to the aided-INS Kalman filter is continuous and uninterrupted. The measurement model of equation (10) applies to either left or right foot measurement since the precise pedometer error statistics are the same for either case.

Application and Use of the Invention

The immediate application of the PPAINS 34 is a POS/LS that requires either no ZUPD's or infrequent ZUPD's. The precise pedometer aiding data replaces ZUPD's as the primary velocity aiding data during GPS outages. A POS/LS requiring no ZUPD's or infrequent ZUPD's has a significant economic benefit in time saved over the current state-of-the-art INS land surveyors that require ZUPD's.

PPNSM Reduction to Practice

FIG. 3 shows a combination in which the PPNSM is reduced to practice in a backpack configuration. An alternative configuration can be a side-pack or hand-held configuration. These will depend on the size and weight of the selected components. Higher accuracy components, in particular the EAMS, will usually be larger and weigh more than lower accuracy components. Specifically the components are the following:

The backpack frame 18 is a rigid platform on which the components are mounted. The actual layout is not important except for the requirement that the EAMS 22 and SBPMS transmitter 29 be located close to each other and rigidly fixed with respect to each other.

The battery and power conversion module 40 in FIG. 3 provide power and the correct voltages to all components. The SBPMS processor 42 of FIGS. 3, 4 and 6 processes data developed by the SBPMS sensors 24, 26 and the SBPMS transmitter 29 to obtain foot left and right foot position vector data. The SBPMS processor 42 is typically a computer and software supplied by the supplier of the SBPMS system. The PPNSM processor 44 combines and uses the vector data from the SBPMS processor 42 and the EAMS 22 data to compute the SBPMS left and right relative position vector data and left and right foot SBPMS relative displacement vector data.

Any SBPMS 28 can be used that provides accurate left and right foot position vector data. The preferred choice is a Polhemus Fastrack II configured to operate with two sensors. Information on the Fastrack II system and others is available from Polhemus, A Rockwell Collins Corporation, 40 Hercules Drive, P.O. Box 560, Colchester, Vt. 05446 U.S.A.

Figure 4:
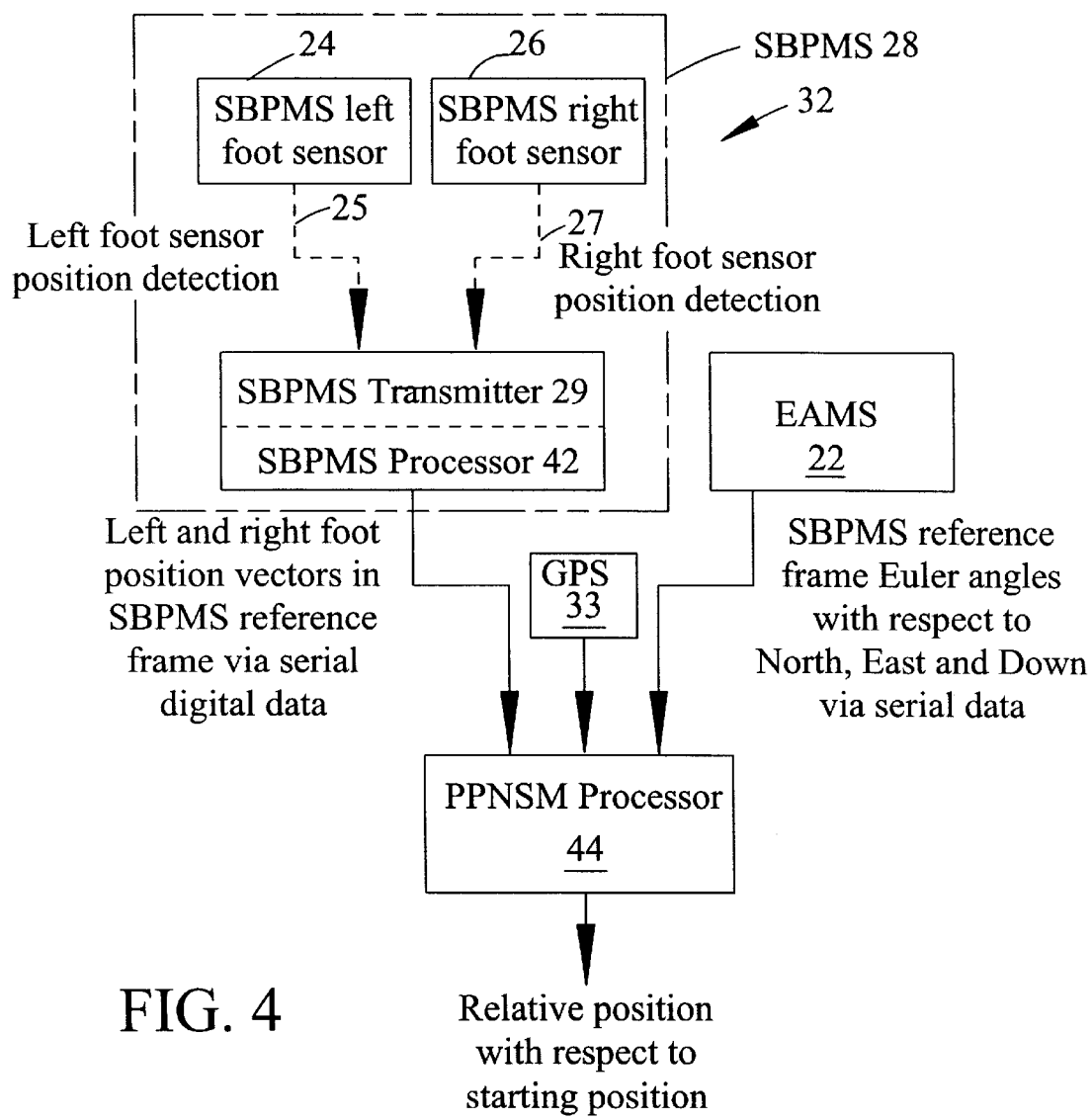
FIG. 4 is a functional block diagram for the precise pedometer PPNSM.

This particular choice comprises the transmitter 29, a processing module and two small sensors. The SBPMS transmitter 29 is rigidly mounted on the backpack/carrier platform or body frame 18 so that it does not move relative to the EAMS 22. As shown in FIGS. 1, 2, and 3, the sensors 24, 26 are attached to the top of the pedestrian's shoes or boots using any suitable form of attachment. Examples are straps, outer boots or embedding the sensors into the shoes or boots. FIGS. 3 and 4 show that signal cables 25, 27 run from the sensors 24, 26 to the SBPMS processor 42 on the backpack/carrier platform 18.

The Polhemus SBPSM system uses a nutating magnetic field emitted by the SBPMS transmitter 29. Sensor response signals to the nutating signals transmitted by the SBPMS transmitter 29 are coupled to the SBPMS processor 42 by the cables; however, in the alternative, the signals might be coupled using RF, IR, acoustic, optic or other signal linking technologies as a matter of design choice. The sensors 24, 26 in the Polhemus systems are packages of orthogonal coils that generate analog signals. The nutating magnetic field induces analog voltages in the coils, which the SBPMS processor 42 receives via connecting cables 25, 27.

The EAMS 22 comprises any EAMS configured to mount rigidly onto a backpack or any other form of carrier platform suitable to be comfortably carried by the pedestrian or by a surveyor person 12. In addition to Euler angle measurements, compass and heading data may be of use and can be supplied from a Honeywell HMR3000 Digital Compass Module available from the Honeywell Solid State Electronics Center. Information on Honeywell Magnetic Sensors is believed to be available from their representatives such as Newark Electronics, 4801 Ravenswood Ave. Chicago. Ill. 60640-4406.

Crossbow Technology Inc. at 41 Daggett Drive., San Jose, Calif. 95134 is a supplier of inertial measuring units The Northrop Grumman Navigation Systems Division, at Woodland Hills, Calif. 91367 is another supplier of INS systems that can be assembled into an AINS.

Figure 5B:
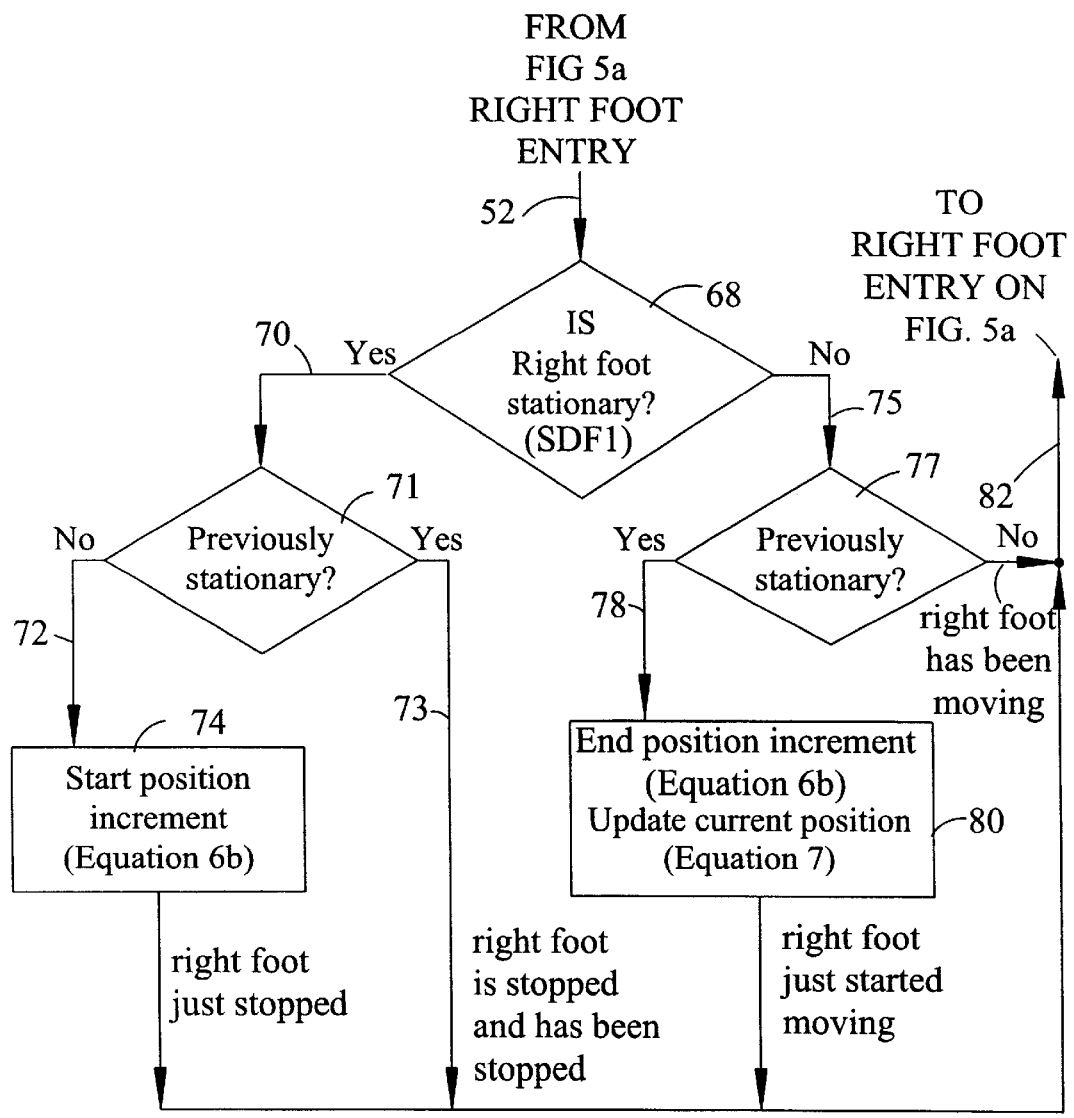

The PPNSM processor 44 in FIG. 3 includes an interface that imports the digital data from the SBPMS processor 42, and software such as that characterized by the algorithms herein and the flowchart of FIGS. 5a and 5b. Software runs the PPN algorithm given in FIGS. 5a and 5b, which implements the PPN solution for each of the left and right sensors. The algorithms used for the PPNSM include those of proceeding equations 1a–1d, 2, 3, 6a–6c and 7.

The phantom block in FIG. 4 shows that the SBPMS system 28 comprises the sensors 24, 26, the cables 25, 27, SBPMS transmitter 29 and SBPMS processor 42. The inputs to the SBPMS module 28 include the analog signals from the sensors 24, 26. The SBPMS processor uses the relative magnitudes and phases of the sensor signal to compute the time indexed relative position vectors of the coils with respect to the transmitter 29 phase center. The SBPMS module 28 outputs the data in digital format on a serial interface, such as RS-232, at data rates on the order of 10 to 50 data frames per second.

The EAMS 22 outputs records or frames of data numerically characterizing the Euler angles in digital format on a serial interface such as RS-232. Data record rates are dependent on the EAMS design and can be as high as 1000 samples per second.

FIG. 4 also shows GPS receiver 33 added to the SBPMS 28 to provide a series of starting positions, when available, for dead-reckoning navigation. The PPNSM in this case re-initializes its starting position whenever a new GPS position record or data string arrives at the PPNSM processor. If the GPS receiver has locked on fewer than four satellites, data is interrupted and the PPNSM continues with the dead-reckoning navigation using the method taught by the flow charts of FIGS. 5a and 5b.

FIGS. 5a and 5b are flow charts that explain the SBPMS program process used in the PPNSM 32. The flow chart of FIG. 5a begins with an entry (block 47), to which all return paths lead for the start of a next SBPMS measurement cycle. The system first gets the X-Y-Z position of left and right sensor from SBPMS (block 48) which represents the step of obtaining and transferring the ith left and right foot position vector data for $\vec{\rho}_{left}^{P}(t_i)$ and $\vec{\rho}_{right}^{P}(t_i)$ at sample time $t_i$ from the SBPMS processor 42 to registers in the PPNSM processor 44 shown in FIG. 4. Although shown as separate computers, it should be understood that computer processing can be achieved using a single or several distributed general-purpose computers as the system design requires. The PPNSM processor 44 then uses Euler angle data from the EAMS 22 to prepare a DCM and calculates the left and right foot time indexed relative position vector data (block 49).

The foot baseline vector is computed using Equation 1c. $\omega_{A\rho}$ is calculated using indexed components of the foot baseline vector (Block 50). If $\omega_{A\rho}$ is determined to be zero or substantially zero, the decision results in a "both stationary" signal indicating that both feet are stationary. If $\omega_{A\rho}$ is determined to be other than zero, one of the feet is moving. If the pedestrian's left foot is moving forward with respect to his right foot, then $\omega_{A\rho} > 0$ and his right foot is stationary. The computer program develops a right stationary signal indicating that the right foot is stationary to the algorithm in response to this condition.

If the pedestrian's right foot is moving forward with respect to his right foot, then $\omega_{A\rho} < 0$ and his left foot is stationary causing the computer algorithm of FIG. 5a provide a left stationary signal indicating that the left foot is stationary.

The process then splits into a left foot process (path 51) and a right foot process (path 52) with an entry on FIG. 5b. The left and right feet are tested for stationary status using the SFD1 algorithm. This test applies to both feet at once and returns an answer LEFT IS STATIONARY or RIGHT IS STATIONARY. If the person is walking, then at least one foot will be stationary at any time, and momentarily both feet will be stationary.

The Left Foot Process

FIG. 5a shows that if the left foot is stationary, (block 53) the system determines if the foot had just been planted or stopped (block 61, path 62) by inspecting its previous time indexed relative position vector to see if it had changed. If the position had changed, indicating that the left foot had been in motion but had now stopped, the system stores a first time indexed relative position vector $\vec{\rho}_{left}^{g}(t_1)$ (block 65). If the system determines that the left foot is stationary (block 53, path 60) and was stationary, (block 61, path 63) the system returns to the entry location (block 47) to begin the next SBPMS measurement of the left and right time indexed relative position vectors.

During the interval following $t_1$, if the right foot is moving and the left foot remains stationary, the origin of the SBPMS system is moving and the value of successive left foot time indexed relative position vectors will continue to change. As the right foot stops and the left foot starts to move, the system determines that the left foot is moving (block 53, path 55) and that the left foot has completed a stationary period (block 56, path 57). The value of the left foot time indexed relative position vector measured on that sample is saved and treated as the next $\vec{\rho}_{left}^{g}(t_2)$ Equation 6a is used next to calculate the next SBPMS left relative displacement vector $\Delta \vec{\rho}_{1-2}^{g}$ (block 58) for the [$t_1$, $t_2$] time interval. If the system had determined that the left foot was moving, and had been moving, (block 53, path 55 and block 56, path 59) the system would have returned to the entry block 47 for the start of another SBPMS measurement.

The Right Foot Process

The flow chart of FIG. 5b begins (via path 52) with the step 01 determining it the right foot is stationary, (block 68). The system determines if the foot had just been planted or stopped (block 71, path 72) into block 74 by inspecting the previous time indexed relative position vector to see if its value had changed. If the position had changed, that would indicate that the right foot had been in motion but had now stopped at time $t_2$. The system stores a first time indexed relative position vector $\vec{\rho}_{right}^{g}(t_2)$ while at block 74. Returning to block 71, if the system determines that the right foot is stationary (block 68, path 70) and was stationary, (block 71, path 73) the system returns to the entry location (block 47) on Figure 5a via paths 73 to 82 and then to block 47 to begin the next SBPMS measurement of the left and right time indexed relative position vectors.

During the interval following $t_2$, if the left foot is moving and the right foot remains stationary, the origin of the SBPMS system is moving and the value of successive right foot time indexed relative position vectors will continue to change. As the left foot stops and the right foot starts to move, the system determines that the right foot is moving (block 68, path 75) and that the right foot has completed a stationary period (block 77, path 78). The value of the right foot time indexed relative position vector measured on that sample is saved and treated as the next $\vec{\rho}_{right}^{g}(t_3)$. Equation 6b is used next to calculate the next right foot position increment vector $\Delta \vec{\rho}_{2-3}^{g}$ (block 80) for the [$t_2$, $t_3$] time interval. If the system had determined that the right foot is moving, and had been moving, (block 68, path 75 and block 77, path 82) the system returns to entry block 47 on FIG. 5a via path 82 for the start of another SBPMS measurement. The combination of PPM processor 44, a general purpose computer, having and executing a stored program to perform the steps outlined above and in connection with the flow charts of FIGS. 5a and 5b represent an example of a computer and program means responsive to the Euler angle values from EAMS 22 and the time indexed left and right position vectors from the SBPMS processor 42 for providing a SBPMS left relative displacement vector and a right SBPMS relative displacement vector as characterized by equations (6a) and (6b).

PPNSM Present Position Computation

Present position is updated by use of Equation 6c to compute successive SBPMS position displacement vectors $\Delta \vec{\rho}_{1-3}^{g}$ followed by the use of Equation 7 to add successive SBPMS position displacement vectors to form an SBPMS aggregate position displacement vector at the conclusion of each right foot motion with the left foot stationary (FIG. 5a, block 58) and at the conclusion of left foot motion with the right foot stationary (FIG. 5b, block 80). The aggregate position vector is then added to the start position to obtain the present position.

PPAINS Reduction to Practice

FIG. 6 shows a typical backpack configuration differing from the PPNSM 32 of FIG. 3 in that the AINS 36 replaces the EAMS 22. The AINS 36 portion of the invention typically comprises a Position and Orientation System (POS) from Applanix Corporation of Richmond, Canada or an AINS from another supplier configured to mount onto a backpack or any other form of carrier that can be carried by a person. The AINS 36 and SBPMS, the SBPMS processor 42 and PPAINS processor and GPS 33 are rigidly fixed to frame 18 with batteries and power conversion unit 40.

FIG. 7 is a functional block diagram of the PPAINS 34 shown in FIG. 6. The SBPMS 28 is functionally identical to the SBPMS of FIG. 4. The SBPMS processor 42 within the SBPMS 28 provides right and or left foot position vector data to the PPAINS processor 92 via vertical signal line or signal path 93 that extends from the SBPMS Processor 42 to an input to the Kalman filter block 96. A Kalman filter 96 is a process or sub program operating within the PPAINS processor IMU 94 is included within AINS 36 and comprises a triad of accelerometers 92. and a triad of gyros and the electronics to format and output the IMU data in digital format on a serial or parallel bus to a NAVIGATIONAL COMPUTER 98, a function within the PPAINS processor 92. In addition to the algorithms used by the Navigational Computer for navigation and for outputting present position, altitude, ground speed track angle, roll, pitch and yaw Euler angle data.

The Kalman filter 96 processes the left foot and or right foot SBPMS relative displacement vector data using Equation 6a, and 6b and the corresponding left and or right inertial navigation solution vector data Equation 8 along with inputs from GPS 33 and inputs from additional aiding sensors (block 100) as an array of indexed input aiding data.

The Kalman filter receives the outputs of the Navigational Computer 98 and processes them to output an array of estimated errors to error controller algorithm (block 102) in FIG. 7. The error controller 102 feeds back error state corrections to the Kalman filter 96. The error controller algorithm outputs estimated errors in position, velocity, and gyro bias rate to correct the operation of the NAVIGATIONAL COMPUTER 98.

Figure 9:
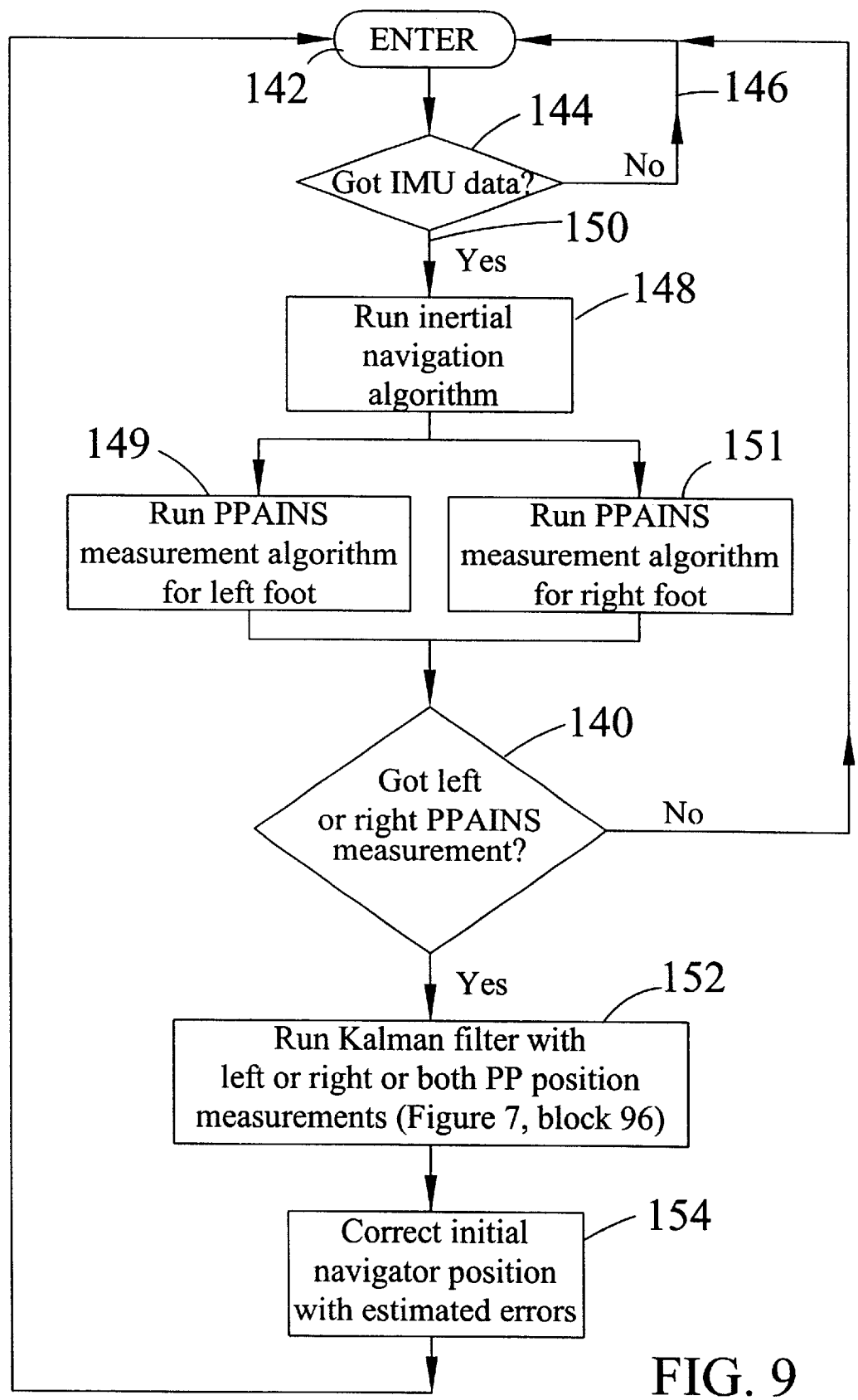
FIG. 9 is a high level flow diagram for the PPAINS measurement algorithm showing the Kalman filter receiving inputs from FIG. 8.

FIGS. 8 and 9 are high-level flow charts that explain the SBPMS program process used in the PPAINS mechanization. The flow chart of FIG. 8 represents each of possibly two separate flow charts if two sensors are used and one flow chart if one sensor is used. If two sensors are used, each flow chart represents a separate SFD2 algorithm for a respective sensor. Each SFD2 algorithm operates independently with no requirement for SBPMS data for the other foot.

The flow chart of FIG. 8 begins with Enter (block 48), to which all return paths lead for the start of a next SBPMS measurement cycle. The system gets the X-Y-Z foot position vectors (block 106) from the SBPMS 28 via signal path 93 as discussed above in connection with FIG. 7.

The left and right position vectors $\vec{\rho}_{left}^{P}(t)$ and $\vec{\rho}_{right}^{P}(t)$ are measured by the SBPMS and transferred from the SBPMS processor 42 to the PPAINS processor 92 via path 93 at a given sample time t.

Euler angles from the AINS are then used to update the DCM $C_p^g$ at the same sample time t. The left or right foot time indexed relative position vector data is calculated using Equation 1a or 1b (block 108).

The geographic position of the ith (left or right) SBPMS sensor $\vec{r}_{foot_i}^{g}$ is then calculated using Equation 4 (block 110). The program first fetches the value of the vector $\vec{r}_{SBPMS}^{g}$, the present position of the SBPMS origin from the AINS. The program then transforms the value of the foot position vector $\vec{\rho}_i^{P}$, into a foot time indexed relative position vector by multiplying each foot position vector by the DCM $C_p^g$.

Equation 4 then adds the $\vec{r}_{SBPMS}^{g}$ vector to the respective foot time indexed relative position vector to obtain the geographic position of the SBPMS sensor vector $\vec{r}_{foot_i}^{g}(t)$ valid at sample time t.

$$|\vec{r}_{foot_i}^{g}(t+\Delta t) - \vec{r}_{foot_i}^{g}(t)| < \Delta r_{moving}$$

The "Is sensor stationary?" question is answered by use of Equation 5 (block 112). The difference between consecutive time-indexed values of the geographic vector position of each SBPMS sensor $\vec{r}_{foot_i}^{g}$ are evaluated in Equation 5.

The difference is a measure of incremental distance, which when stationary should be zero. When the incremental distance calculation exceeds a threshold $\Delta r_{moving}$ given by the expected INS velocity error (typically 0.05 meters per second) multiplied by the time difference $\Delta t$, the foot or its respective sensor is determined to be moving. At incremental distances less than $\Delta r_{moving}$, the foot is determined to be stationary if and when the condition exits for a sufficiently long duration. The duration will depend on the errors in the INS, SBPMS and expected gait of the pedestrian. A typical test duration is one second. Each determination is time indexed and saved so that it can be compared with the most recent past determination.

If the sensor is determined to be stationary, by following the YES branch out of block 112 to block 114, the next question to be answered is if the sensor JUST STOPPED, meaning that it is stationary now but it had been previously moving (block 114, path 118). If the difference between consecutive values of the geographic position of the SBPMS sensor $\vec{r}_{foot_i}^{g}$ is less than the value required to show movement, the program leaves block 114 and passes down the STILL STATIONARY path 119.

Passage onto the JUST STOPPED (path 118 to block 120) marks the start of the [$t_1$, $t_2$] interval. The conclusion of the [$t_1$, $t_2$] interval is marked by an initial decision that the sensor is now not stationary (block 112, path 117) followed by a decision that the sensor was previously stationary (block 116, path 128) by determining and evaluating the difference between the present and the most recent past value of the geographic position of the SBPMS respective sensor vector $\vec{r}_{foot_i}^{g}$ (Equation 5). The determination that the foot has JUST STARTED (path 128) marks the conclusion of the [$t_1$, $t_2$] interval.

With the JUST STOPPED decision made, the program begins to evaluate Equation 8 (block 120) to obtain a value for $\Delta \vec{r}_{SNV1-2}^{g}$, the displacement of the SBPMS origin measured by the AINS. Equation 8 is an integration process that begins at $t_1$ and concludes at $t_2$. The interval [$t_1$, $t_2$] is the interval that starts when the sensor comes to rest, and concludes with the sensors first new motion. Equation 8 measures and provides the distance that the SBPMS origin moves during the [$t_1$, $t_2$] interval as determined by integrating the sum of the navigator velocity NED components and the velocity components due to the difference in locations of the SBPMS origin and the INS origin and the rotational rate of the p-frame as the pedestrian moves. Equation 8 shows the p-frame rotational rate induced velocity to be obtained by taking the cross product of the lever arm vector from the IMU inertial center to the SBPMS measurement origin and the IMU angular rate in IMU body frame or p-frame coordinates. The cross product results in a vector which is then multiplied by the DCM to map the p-frame rotational rate induced velocity into g-frame NED components to be added to the INS navigator NED velocity components before integration. The resulting measurement of distance during the interval is used in connection with Equation 9a and 9b as a Kalman filter input.

After starting the SNV NED velocity integration (block 120), the program advances and begins to the "Start precise pedometer time indexed relative position" function, (the evaluation of Equation 6a and or 6b) to obtain the SBPMS left relative displacement vectors for the [$t_1$, $t_2$] interval (block 122). At the conclusion of the "Start precise pedometer time indexed relative position" function the program returns to Enter block 48.

The STILL STATIONARY path 119 is traversed during the interval [$t_1$, $t_2$]. Equation 8 is updated with each pass (block 124). The precise pedometer SBPMS left and right relative displacement vectors of Equation 6a and or 6b continue to change and be monitored for their indexed value during the [$t_1$, $t_2$] interval as the sensor remains stationary (block 126). At the conclusion of each pass through the step of block 126, the program returns to the Enter block 48.

The integration process of the Equation 8 terminates and the final indexed values of the SBPMS left relative displacement vectors at time $t_2$ are recorded as the program branches to the JUST STARTED branch via path 128 to block 130. This path is traversed in response to the condition that consecutive values of $\vec{r}_{foot_i}^{g}$ from Equation 4 resulted in consecutive Equation 5 values that resulted in a decision that the sensor has just started to move after being stationary.

The step "Construct Present Position incremental position measurement" occurs at time $t_2$. Kalman filter measurement differences $\vec{z}_{SNV-PP}$ are calculated using Equations 9a and 9b (block 130). The program then transfers the Kalman filter measurement differences $\vec{z}_{SNV-PP}$ for interval [$t_1$, $t_2$] and or for [$t_2$, $t_3$] to the Kalman filter at block 140 in FIG. 9.

FIG. 9 is a high level flow chart that shows how the PPAINS program relates to and outputs successive Kalman filter measurement vector difference $\vec{z}_{SNV-PP}$ for each sensor to become inputs to the Kalman filter at block 140.

The ENTER block 142 is the starting location for the AINS or NAVIGATIONAL COMPUTER program 98 in FIG. 7. The program samples the sensor outputs of the INS for velocity and angular rate data (block 144). The sample rate is higher than the sensor bandwidth which results in a cycle back to the ENTER block 142 via path 146. When sensor data is updated, the data is passed to the "Run inertial navigation algorithm" (block 148) via YES path 150. The navigational algorithm and the software for running and sampling the sensors is provided by the AINS manufacturer with the AINS system hardware or is supplied and integrated with the PPAINS software under license.

The "Run inertial navigation algorithm" (block 148) provides a continual series of present position updates to one or both of the "Run PPAINS measurement algorithm for left foot" 149 and the Run PPAINS measurement algorithm for right foot 151. The flow chart of the "Run inertial navigation algorithm" in block 148 is duplicated for block 151 if a second sensor is used. If one sensor is used, it could be attached to the left or the right foot.

The output of blocks 149 and 151 are Kalman filter measurement vector difference $\vec{z}_{SNV-PP}$, which are transferred to block 140 in an asynchronous manner as they become available. The subroutine of block 140 transfers each new value of a Kalman filter measurement vector difference $\vec{z}_{SNV-PP}$ to the "Run Kalman filter left or right or both PP position measurements (FIG. 7, block 96)" 152. The $\vec{z}_{SNV-PP}$ inputs to the Kalman filter makes position, velocity and attitude errors observable to the Kalman filter and permits the Kalman filter to calculate and output estimated errors to the ERROR CONTROLLER 102 in FIG. 7 and to receive error state corrections from the ERROR CONTROLLER. The ERROR CONTROLLER 102 is a program embedded within the AINS program and is also represented by the function of block 152.

Estimated errors in present position are transferred to the "Correct initial navigator position with estimated errors" block, which represents the function of correcting present position outputs of the AINS by correcting the outputs of the NAVIGATIONAL COMPUTER 98.

While the invention has been explained in connection with several embodiments, it is intended that the appended claims be used to limit the scope of this patent.

Acronym Glossary

| | |
|---|---|
| AHRS | Attitude and Heading Reference System |
| AINS | Aided Inertial Navigation System |
| DCM | Direction Cosine Matrix |
| DFM | Design File Memo |
| DMI | Distance Measurement Indicator |
| EAMS | Euler Angle Measurement Subsystem |
| GPS | Global Positioning System |
| IMU | Inertial Measurement Unit |
| INS | Inertial Navigation System |
| NED | North-East-Down |
| POS | Position and Orientation System |
| POS/LS | Position and Orientation System for Land Survey |
| PPAINS | Precise Pedometer Aided Inertial Navigation System |
| PPN | Precise Pedometer Navigator |
| PPNSM | Precise Pedometer Navigator Simple Mechanization |
| SBPMS | Short Baseline Position Measurement Subsystem |
| SFD1,2 | Stationary Foot Detection algorithm 1 or 2 |
| VG | Vertical Gyro |
| ZUPD | Zero velocity UPDate |

What is claimed is:

1. A pedometer navigator system carried by a pedestrian having a left and right foot for calculating an SBPMS position displacement vector in a fixed navigational coordinate frame, having a north, east and down axis, comprising:

an Euler Angle Measuring Subsystem (EAMS) having a right-handed or left-handed coordinate frame having an EAMS origin, the EAMS providing roll, pitch and azimuth Euler angle values for the right-handed or left-handed coordinate frame with respect to the north-east-down axes of the fixed navigation coordinate frame, a Short Baseline Position Measuring Subsystem (SBPMS) having an SBPMS coordinate frame having an SBPMS origin for measuring and providing a continuous series of time indexed left position vectors $\vec{\rho}_{left}^{P}$ and right position vectors $\vec{\rho}_{right}^{P}$ in SBPMS coordinate values characterizing the position of the left and right foot with respect to the SBPMS origin, the SBPMS coordinate frame being coupled to and in a fixed and predetermined alignment with the EAMS right-handed or left-handed coordinate frame, a computer means responsive to the roll, pitch and azimuth Euler angle values and the time indexed left and right position vectors for providing a first transition vector in fixed navigation coordinate frame values, characterizing the movement of the SBPMS origin for each interval that a left foot is stationary and the right foot is moving and a second transition vector in fixed navigation coordinate frame values characterizing the movement of the SBPMS origin for each interval that a right foot is stationary and the left foot is moving, the first and second transition vectors being added to form an SBPMS position displacement vector.

2. The pedometer navigator system of claim 1 further comprising:
  a body frame, and wherein, the EAMS and the SBPMS are coupled to the body frame, the EAMS and the SBPMS being positioned to align the EAMS right-handed or left-handed coordinate frame to be in fixed relation with the SBPMS coordinate frame.

3. The pedometer navigator system of claim 1 wherein the EAMS is selected from the group comprising:
  an Attitude and Heading Reference System (AHRS), an Inertial Navigation System (INS) or an Aided Inertial Navigation System (AINS).

4. The pedometer navigator system of claim 1 wherein the computer means further comprises a stationary foot detection algorithm for generating
  a both stationary signal indicating that both feet are stationary,
  a left stationary signal indicating that the left foot is stationary and
  a right stationary signal indicating that the right foot is stationary, the algorithm comprising the steps of:
    continuously calculating a time indexed direction cosine matrix (DCM),
    multiplying a time indexed left position vector $\vec{\rho}_{left}^{\,P}$ and right position vector $\vec{\rho}_{right}^{\,P}$ by the respective time indexed DCM to obtain a respective time indexed left time indexed relative position vector $\vec{\rho}_{left}^{\,g}$ and right time indexed relative position vector $\vec{\rho}_{right}^{\,g}$ in fixed navigation coordinate frame values,
    calculating a time indexed baseline vector by subtracting the left time indexed relative position vector from the right time indexed relative position vector, each time indexed baseline vector having a time indexed baseline vector north component $\Delta\rho_N$ and an indexed baseline vector east component $\Delta\rho_E$,
    calculating an azimuth rotational rate of the time indexed baseline vector $\omega_{\Delta\rho}$ for each time indexed baseline vector's north component and east component, the rates of change $\Delta\dot{\rho}_E$ and $\Delta\dot{\rho}_N$ of the north and east components, the sum of squared values of each indexed baseline vector's north component and east component, $\Delta\rho_N^2 + \Delta\rho_E^2$, and
    calculating the value of the azimuth rotational rate of the time indexed baseline vector $\omega_{\Delta\rho}$ from the following equation for each pair of indexed baseline vector's north component and east component, $$\omega_{\Delta\rho} = \frac{1}{\Delta\rho_N^2 + \Delta\rho_E^2}(\Delta\rho_N \Delta\dot{\rho}_E - \Delta\rho_E \Delta\dot{\rho}_N)$$

the computer means being further characterized to provide
    the both stationary signal indicating a decision that neither foot is moving subject to a corresponding determination that the absolute magnitude of the rate of change of azimuth $\omega_{\Delta\rho}$ is below a predetermined (and substantially zero) noise threshold, and provide
    the left stationary signal indicating a decision that the pedestrian's left foot is moving forward with respect to his right foot in response to the rate of change of azimuth $\omega_{\Delta\rho}$ exceeding the predetermined noise threshold and the sign of $\omega_{\Delta\rho}$ being positive, i.e., $\omega_{\Delta\rho}<0$, and provide
    the right stationary signal indicating a decision that the pedestrian's right foot is moving forward with respect to his left foot in response to the rate of change of azimuth $\omega_{\Delta\rho}$ exceeding the predetermined noise threshold and the sign of $\omega_{\Delta\rho}$ being negative, i.e., $\omega_{\Delta\rho}<0$ being negative.

5. The pedometer navigator system of claim 4 wherein the computer means is further characterized to calculate the SBPMS current position $\vec{r}^{\,g}(t_{current})$ by the steps of:
  adding all SBPMS position displacement vectors $\Delta\vec{\rho}_{1\text{-}3}^{\,g}$ from a starting time to the current time,
  summing the result of the previous step with the SBPMS starting position $\vec{r}^{\,g}_{start}$, the sum being characterized by the equation $$\vec{r}^{\,g}(t_{current}) = \vec{r}^{\,g}_{start} + \sum_{t_{start}}^{t_{current}} \Delta\vec{\rho}^{\,g}_{1-3}(t_i).$$

6. The pedometer navigator system of claim 1 wherein the computer means further comprises an algorithm for calculating the SBPMS current position $\vec{r}^{\,g}(t_{curret})$ by the steps of:
  using a left and right stationary foot detection algorithm for generating
  a both stationary signal indicating that both feet are stationary,
  a left stationary signal indicating that the left foot is stationary and
  a right stationary signal indicating that the right foot is stationary, and
  the steps for the left and right stationary foot detection algorithm comprising:
    continuously calculating a time indexed DCM (a time indexed direction cosine matrix),
    multiplying each time indexed left position vector $\vec{\rho}_{left}^{\,P}$ and right position vector $\vec{\rho}_{right}^{\,g}$ by the respective DCM to obtain a respective left time indexed relative position vector $\vec{\rho}_{left}^{\,g}$ and right time indexed relative position vector $\vec{\rho}_{right}^{\,g}$ in fixed navigation coordinate frame values,
    calculating an indexed baseline vector by subtracting the left time indexed relative position vector from the right time indexed relative position vector, each indexed baseline vector having an indexed baseline vector north component $\Delta\rho_N$ and an indexed baseline vector east component $\Delta\rho_E$,
    calculating an azimuth rotational rate of the time indexed baseline vector $\omega_{\Delta\rho}$ for each time indexed baseline vector's north component and east component, $\Delta\dot{\rho}_e$ and $\Delta\dot{\rho}_N$, from the following equation for each pair of indexed baseline vector's north component and east component, $$\omega_{\Delta\rho} = \frac{1}{\Delta\rho_N^2 + \Delta\rho_E^2}(\Delta\rho_N \Delta\dot{\rho}_E - \Delta\rho_E \Delta\dot{\rho}_N)$$

the computer and algorithm means being further characterized to provide
  the both stationary signal indicating a decision that neither foot is moving subject to a corresponding determination that the absolute magnitude of the rate of change of azimuth $\omega_{\Delta\rho}$ is below a predetermined (and substantially zero) noise threshold, and provide the left stationary signal indicating a decision that the pedestrian's left foot is moving forward with respect to his right foot in response to the rate of change of azimuth $\omega_{A\rho}$ exceeding the predetermined noise threshold and the sign of $\omega_{A\rho}$ being positive, i.e., $\omega_{A\rho} < 0$, and provide the right stationary signal indicating a decision that the pedestrian's right foot is moving forward with respect to his left foot in response to the rate of change of azimuth $\omega_{A\rho}$ exceeding the predetermined noise threshold and the sign of $\omega_{A\rho}$ being negative, i.e., $\omega_{A\rho} < 0$ being negative, the steps for calculating the SBPMS current position $\vec{r}^g(t_{current})$ further comprising the steps of:

using each left stationary signal to mark times $t_1$ and $t_2$ and contemporaneously calculate a left indexed SBPMS left relative displacement vector $\Delta \vec{\rho}_{1\text{-}2}{}^g$ from $$\Delta \vec{\rho}_{1\text{-}2}{}^g = C_p{}^g(t_2) \vec{\rho}_{left}{}^p(t_2) - C_p{}^g(t_1) \vec{\rho}_{left}{}^p(t_1)$$

and using each right stationary signal to mark times $t_2$ and $t_3$ and to contemporaneously calculate a right indexed SBPMS relative displacement vector $\Delta \vec{\rho}_{2\text{-}3}{}^g$ from $$\Delta \vec{\rho}_{2\text{-}3}{}^g = C_p{}^g(t_3) \vec{\rho}_{right}{}^p(t_3) - C_p{}^g(t_2) \vec{\rho}_{right}{}^p(t_2),$$

and to calculate an SBPMS position displacement vector $\Delta \vec{\rho}_{1\text{-}3}{}^g$ from $$\Delta \vec{\rho}_{1\text{-}3}{}^g = \Delta \vec{\rho}_{1\text{-}2}{}^g + \Delta \vec{\rho}_{2\text{-}3}{}^g$$

and where index times $t_1$ and $t_2$ for the SBPMS left relative displacement vector are respectively marked at the beginning and end of each left stationary signal and where the times $t_2$ and $t_3$ for the SBPMS right relative displacement vector are respectively marked at the beginning and end of each right stationary signal, calculating the SBPMS current position $\vec{r}^g(t_{current})$ by the steps of:

adding all SBPMS position displacement vectors $\Delta \vec{\rho}_{1\text{-}3}{}^g$ from a starting time to the current time, summing the result of the previous step with the a SBPMS starting position $\vec{r}^g{}_{start}$, the SBPMS current position $\vec{r}^g(t_{current})$ being characterized by the equation $$\vec{r}^g(t_{current}) = \vec{r}^g_{start} + \sum_{t_{start}}^{t_{current}} \Delta \vec{\rho}^g_{1\text{-}3}(t_i).$$

7. A pedometer navigator system carried by a pedestrian, comprising:

an Aided Inertial Navigation System (AINS) having a right-handed or left-handed coordinate frame having an AINS origin, the AINS providing roll, pitch and azimuth angle Euler angle values for the right-handed or left-handed coordinate frame with respect to a north-east-down axes of a fixed navigation coordinate frame, the AINS having a Kalman filter responsive to at least one aiding input, a Short Baseline Position Measuring Subsystem(SBPMS) having an SBPMS coordinate frame having an SBPMS origin for measuring and providing a series of time indexed position vectors $\vec{\rho}_i{}^P$, each vector characterizing a position of at least a first indexed foot with respect to the SBPMS origin, the SBPMS coordinate frame being coupled to and in a fixed and predetermined alignment with the AINS right-handed or left-handed coordinate frame, a computer means for executing a program responsive to the roll, pitch and azimuth Euler angle values and the series of time indexed position vectors for providing a series of SBPMS left and right relative displacement vectors in fixed navigation coordinate frame values characterizing the movement of the SBPMS origin for each interval during which the respective indexed foot is stationary and the other indexed foot is moving, each SBPMS left and right relative displacement vector being output to the Kalman filter aiding input.

8. The pedometer navigator system of claim 7 wherein the computer means is coupled to receive and is responsive to a series of time indexed inertial navigator velocity North-east-down components $\vec{v}_{SNV}{}^g$, a series of indexed body rates of the AINS $\vec{\omega}_S{}^b$, as inputs from the AINS and a data input characterizing a lever arm vector from the AINS center to the SBPMS origin $\vec{l}_{S\text{-}P}{}^b$, the computer means and further comprising:

a computer program for calculating indexed values of an inertial navigation solution displacement $\Delta \vec{r}_{SNV1\text{-}2}{}^g$ using the equation:

$$\Delta \vec{r}^g_{SNV1\text{-}2} = \int_{t_1}^{t_2} \left( \vec{v}^g_{SNV} + C_b^g \left( \vec{\omega}_S^b \times \vec{l}_{S\text{-}P}^b \right) \right) dt \tag{8a}$$

for a left foot inertial navigation solution displacement, and or the equation:

$$\Delta \vec{r}^g_{SNV2\text{-}3} = \int_{t_2}^{t_3} \left( \vec{v}^g_{SNV} + C_b^g \left( \vec{\omega}_S^b \times \vec{l}_{S\text{-}P}^b \right) \right) dt \tag{8b}$$

for a right foot inertial navigation solution displacement wherein $\vec{v}_{SNV}{}^g$ represents the series of time indexed inertial navigator velocity NED components, $\vec{\omega}_S{}^b$ represents the series of body rates of the AINS and $\vec{l}_{S\text{-}P}{}^b$ represents the lever arm vector from the AINS center to the SBPMS origin.

9. The pedometer navigator system of claim 8 wherein the Kalman filter is coupled to receive and calculate the difference between the inertial navigation solution displacement and the series of SBPMS left and right relative displacement vectors for each foot, the differences being calculated from the equations:

$$\vec{z}_{SNV\text{-}PP} = \Delta \vec{r}_{SNV1\text{-}2}{}^g - \Delta \vec{\rho}_{1\text{-}2}{}^g$$

for the left foot and $$\vec{z}_{SNV\text{-}PP} = \Delta \vec{r}_{SNV2\text{-}3}{}^g - \Delta \vec{\rho}_{2\text{-}3}{}^g$$

for the right foot; whereby,
the differences make the position, velocity and attitude errors observable to the Kalman filter.

10. The pedometer navigator system of claim 7 wherein the computer means further comprises:
an inertial navigation system referenced stationary foot detection algorithm for each foot having an SBPMS sensor,
the algorithm comprising the steps of:
calculating a time indexed Direction Cosine Matrix (DCM) at time t,
calculating a value for the absolute (right or left) foot position $\vec{r}_{foot_i}^g$ at a first time t for each foot having a sensor, the algorithm steps comprising:
multiplying a respective indexed position vector $\vec{\rho}_i^g$ by its respective DCM to obtain a respective time-indexed SBPMS relative position vector $\vec{\rho}_i^g$ in fixed navigation coordinate frame values at index time t,
fetching an indexed geographic position of the SBPMS, $\vec{r}_{SBPMS}^g$, from the AINS at index time t,
adding the indexed geographic position of the SBPMS, $\vec{r}_{SBPMS}^g$ to the respective time indexed relative position vector $\vec{\rho}_i^g$ at index time t to obtain a value for $\vec{r}_{foot_i}^g$ at index time t,
multiplying the next respective indexed position vector $\vec{\rho}_i^p$ by its respective DCM to obtain a respective time indexed relative position vector $\vec{\rho}_i^g$ in fixed navigation coordinate frame values at index time t+Δt,
fetching the next indexed geographic position of the SBPMS, $\vec{r}_{SBPMS}^g$, from the AINS at index time t+Δt,
adding the indexed geographic position of the next SBPMS, $\vec{r}_{SBPMS}^g$ to the respective next time indexed relative position vector $\vec{\rho}_i^g$ to obtain a value for $\vec{r}_{foot_i}^g$ at time t+Δt,
subtracting the value of $\vec{r}_{foot_i}^g$(t) from $\vec{r}_{foot_i}^g$(t+Δt),
calculating the absolute value of the vector difference, and generating a foot stationary signal for each foot subject to the condition:

$|\vec{r}_{foot_i}^g(t+\Delta t) - \vec{r}_{foot_i}^g(t)| < \Delta r_{stationary}$ for a predetermined time interval.

11. The pedometer navigator system of claim 7 wherein the computer means foot detection algorithm predetermined time interval of claim 8 is a time interval of at least one second.

12. The pedometer navigator system of claim 7 wherein the computer means further comprises:
a stationary indexed foot detection algorithm responsive to
the roll, pitch and azimuth Euler angle values,
the series of time indexed position vectors, $\vec{\rho}_i^p$, and
a computed value of the indexed geographic position of the SBPMS, $\vec{r}_{SBPMS}^g$, from the AINS by calculating an absolute (right or left) indexed foot position $\vec{r}_{foot_i}^g$ in geographic coordinates using the equation $\vec{r}_{foot_i}^g = \vec{r}_{SBPMS}^g + C_p^g \vec{\rho}_i^p$ where
$C_p^g$ is a Direction Cosine Matrix (DCM) that transforms from the p-frame to the g-frame,
the indexed foot detection algorithm providing a signal indicating that the indexed foot is stationary on the condition that the difference between successive values of $\vec{r}_{foot_i}^g$ remain below a predetermined threshold value for a time interval exceeding a predetermined time limit.

13. The pedometer navigator system of claim 10 wherein the difference value for successive indexed foot position are calculated and
a determination is made that the indexed foot is stationary on the condition that the absolute difference value of $|\vec{r}_{foot_i}^g(t+\Delta t) - \vec{r}_{foot_i}^g(t)| < \Delta r_{stationary}$ for a time interval of at least one second.

14. The pedometer navigator system of claim 7 wherein the computer means further comprises an algorithm for calculating a right foot stationary signal and a left foot stationary foot s signal for the right and left foot by the steps of:
continuously calculating a time indexed Direction Cosine Matrix (DCM),
multiplying each time indexed left position vector $\vec{\rho}_{left}^p$ and or right position vector $\vec{\rho}_{right}^p$ by the respective DCM to obtain a respective left time indexed relative position vector $\vec{\rho}_{left}^p$ and right time indexed relative position vector $\vec{\rho}_{right}^p$ in fixed navigation coordinate frame values,
calculating an indexed baseline vector by subtracting the left time indexed relative position vector from the right time indexed relative position vector, each indexed baseline vector having an indexed baseline vector north component $\Delta \rho_N$ and
an indexed baseline vector east component $\Delta \rho_E$,
calculating the rotational rate of the baseline vector $\omega_{\Delta\rho}$ for each indexed baseline vector's north component and east component, the rates of change $\Delta\dot{\rho}_E$ and $\Delta\dot{\rho}_N$ of the north and east components, the sum of squared values of each indexed baseline vector's north component and east component, $\Delta\rho_N^2 + \Delta\rho_E^2$, and
calculating the value of $\omega_{\Delta\rho}$ from the following equation for each pair of indexed baseline vector's north component and east component, $$\omega_{\Delta\rho} = \frac{1}{\Delta\rho_N^2 + \Delta\rho_E^2}(\Delta\rho_N \Delta\dot{\rho}_E - \Delta\rho_E \Delta\dot{\rho}_N)$$

the computer and algorithm means being further characterized to provide
a right stationary signal indicating that the pedestrian's left foot is moving forward with respect to his right foot in response to the rate of change of azimuth $\omega_{\Delta\rho}$ exceeding a predetermined noise threshold and the sign of $\omega_{\Delta\rho}$ being positive, i.e., $\omega_{\Delta\rho} < 0$, and provide
a left stationary signal indicating that the pedestrian's right foot is moving forward with respect to his left foot in response to the rate of change of azimuth $\omega_{\Delta\rho}$ exceeding a predetermined noise threshold and the sign of $\omega_{\Delta\rho}$ being negative, i.e., $\omega_{\Delta\rho} < 0$ being negative.

15. The pedometer navigator system of claim 12 wherein the computer means further comprises an algorithm for calculating an SBPMS position displacement vector for the left and right foot by the steps of:

using each left stationary signal to mark times $t_1$ and $t_2$ and contemporaneously calculate an SBPMS left relative displacement vector $\Delta\vec{\rho}_{1-2}{}^g$ from $$\Delta\vec{\rho}_{1-2}{}^g = C_p{}^g(t_2)\vec{\rho}_{left}{}^p(t_2) - C_p{}^g(t_1)\vec{\rho}_{left}{}^p(t_1)$$

and using each right stationary signal to mark times $t_2$ and $t_3$ and to contemporaneously calculate an SBPMS right relative displacement vector $\Delta\vec{\rho}_{2-3}{}^g$ from $$\Delta\vec{\rho}_{2-3}{}^g = C_p{}^g(t_3)\vec{\rho}_{right}{}^p(t_3) - C_p{}^g(t_2)\vec{\rho}_{right}{}^p(t_2),$$

and calculating the SBPMS position displacement vector $\Delta\vec{\rho}_{1-3}{}^g$ from $$\Delta\vec{\rho}_{1-3}{}^g = \Delta\vec{\rho}_{1-2}{}^g + \Delta\vec{\rho}_{2-3}{}^g$$

and where index times $t_1$ and $t_2$ are respectively marked at the beginning and end of each left stationary signal and where the times $t_2$ and $t_3$ are respectively marked at the beginning and end of each right stationary signal.

16. The pedometer navigator system of claim 14 wherein the computer means further comprises:

an INS referenced stationary foot detection algorithm for each foot having an SBPMS sensor, the algorithm comprising the steps of:

calculating a time indexed DCM (a time indexed direction cosine matrix) valid at time t calculating a value for the absolute (right or left) foot position $\vec{r}_{foot_i}{}^g$ at a first time t for each foot having a sensor, the algorithm steps comprising:

multiplying a respective indexed position vector $\vec{\rho}_i{}^p$ by its respective DCM to obtain a respective time indexed relative position vector $\vec{\rho}_i{}^g$ in fixed navigation coordinate frame values at index time t, fetching an indexed geographic position of the SBPMS, $\vec{r}_{SBPMS}{}^g$, from the AINS at index time t, adding the indexed geographic position of the SBPMS $\vec{r}_{SBPMS}{}^g$ to the respective time indexed relative position vector $\vec{\rho}_i{}^g$ at index time t to obtain a value for $\vec{r}_{foot_i}{}^g$ at index time t, multiplying the next respective indexed position vector $\vec{\rho}_i{}^p$ by its respective DCM to obtain a respective time indexed relative position vector $\vec{\rho}_i{}^g$ in fixed navigation coordinate frame values at index time $t+\Delta t$, fetching the next indexed geographic position of the SBPMS, $\vec{\rho}_{SBPMS}{}^g$, from the AINS at index time $t+\Delta t$, adding the indexed geographic position of the next SBPMS, $\vec{r}_{SBPMS}{}^g$ to the respective next time indexed relative position vector $\vec{r}_i{}^g$ to obtain a value for $\vec{r}_{foot_i}{}^g$ at time $t+\Delta t$, subtracting the value of $\vec{r}_{foot_i}{}^g(t)$ from $\vec{r}_{foot_i}{}^g(t+\Delta t)$, calculating the absolute value of the vector difference, and generating a foot stationary signal for each foot subject to the condition:

$$|\vec{r}_{foot_i}{}^g(t+\Delta t) - \vec{r}_{foot_i}{}^g(t)| < \Delta r_{moving}$$

for a predetermined time interval.

17. A pedometer navigator system carried by a pedestrian, comprising:

an Aided Inertial Navigation System (AINS) providing roll, pitch and azimuth Euler angle values, a Short Baseline Position Measuring Subsystem (SBPMS) and providing a series of time indexed position vectors $\vec{\rho}_i{}^p$, characterizing the position of at least a first indexed foot with respect to the SBPMS origin, an SBPMS coordinate frame being coupled to the AINS, a computer means for executing a program responsive to the roll, pitch and azimuth Euler angle values and the (SBPMS,) series of time indexed position vectors for providing a series of SBPMS left and right relative displacement vectors characterizing the movement of the SBPMS origin as aiding inputs to a Kalman filter.

18. The pedometer navigator system of claim 17 wherein Aided Inertial Navigation System (AINS) further comprises:

a right-handed or left-handed coordinate frame having an AINS origin, the AINS providing roll, pitch and azimuth angle values for the right-handed or left-handed coordinate frame with respect to a north-east-down axes of a fixed navigation coordinate frame and wherein, the SBPMS (short baseline position measuring subsystem) has an SBPMS coordinate frame having a SBPMS origin for measuring and providing a series of time indexed position vectors $\vec{\rho}_i{}^p$, each vector characterizing the position of at least a first indexed foot with respect to the SBPMS origin, the SBPMS coordinate frame being coupled to and in a fixed and predetermined alignment with the AINS right-handed or left-handed coordinate frame.

19. The pedometer navigator system of claim 17 wherein the computer means is coupled to receive and be responsive to a series of time indexed inertial navigator velocity components $\vec{v}_{SNV}{}^g$, a series of indexed body rates of the AINS $\vec{\omega}_S{}^b$, and a data input characterizing a lever arm vector from the AINS center to the SBPMS origin $\vec{l}_{S-P}{}^b$, the computer means and further comprising a computer program for calculating indexed values of an inertial navigation solution displacement $\Delta\vec{r}_{SNV1-2}{}^g$ using the equation:

$$\Delta\vec{r}_{SNV1-2}^g = \int_{t_1}^{t_2}\left(\vec{v}_{SNV}^g + C_b^g\left(\vec{\omega}_S^b \times \vec{l}_{S-P}^b\right)\right)dt \qquad (8a)$$

for a left foot inertial navigation solution displacement, and or the equation:

$$\Delta\vec{r}_{SNV2-3}^g = \int_{t_2}^{t_3}\left(\vec{v}_{SNV}^g + C_b^g\left(\vec{\omega}_S^b \times \vec{l}_{S-P}^b\right)\right)dt \qquad (8b)$$

for a right foot inertial navigation solution displacement.

20. The pedometer navigator system of claim 17 wherein the Kalman filter is coupled to receive and calculate the difference between an inertial navigation solution displacement and an SBPMS left and right relative displacement vector for each foot, the differences being calculated from the equations:

$$\vec{z}_{SNV-PP} = \Delta \vec{r}_{SNV1-2}{}^g - \Delta \vec{\rho}_{1-2}{}^g$$

for the left foot and $$\vec{z}_{SNV-PP} \Delta \vec{r}_{SNV2-3}{}^g - \Delta \vec{\rho}_{2-3}{}^g$$

for the right foot.

* * * * *